(12) United States Patent
Takeda

(10) Patent No.: US 7,281,061 B2
(45) Date of Patent: Oct. 9, 2007

(54) TIME MANAGING APPARATUS FOR MANAGING TIME TO SYNCHRONIZE WITH OTHER APPARATUSES

(75) Inventor: Hideyuki Takeda, Nagoya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 499 days.

(21) Appl. No.: 10/007,807

(22) Filed: Dec. 5, 2001

(65) Prior Publication Data

US 2002/0099811 A1 Jul. 25, 2002

(30) Foreign Application Priority Data

Dec. 6, 2000 (JP) ............................. 2000-372072

(51) Int. Cl.
*G06F 15/16* (2006.01)

(52) U.S. Cl. ...................................... 709/248; 709/223

(58) Field of Classification Search ................ 709/248, 709/220–223; 348/460; 725/29, 139, 58, 725/50, 134, 142; 370/485–488
See application file for complete search history.

(56) References Cited

U.S. PATENT DOCUMENTS

| | | | |
|---|---|---|---|
| 4,295,194 A | | 10/1981 | Darden et al. |
| 4,582,434 A | * | 4/1986 | Plangger et al. ............... 368/46 |
| 5,293,357 A | * | 3/1994 | Hallenbeck .................... 725/39 |
| 5,442,776 A | * | 8/1995 | Masleid et al. ............. 713/503 |
| 5,557,585 A | * | 9/1996 | Hanai et al. ................... 368/43 |
| 5,661,700 A | | 8/1997 | Weppler |
| 5,704,030 A | * | 12/1997 | Kanzaki ........................ 714/12 |
| 5,949,492 A | * | 9/1999 | Mankovitz ................... 348/473 |
| 5,963,264 A | * | 10/1999 | Jackson ........................ 348/460 |
| 5,968,133 A | * | 10/1999 | Latham et al. ............... 709/248 |
| 5,974,218 A | | 10/1999 | Nagasaka et al. |
| 6,078,852 A | | 6/2000 | Milkner et al. |
| 6,137,943 A | * | 10/2000 | Kanda .......................... 386/46 |
| 6,199,169 B1 | * | 3/2001 | Voth ............................ 713/400 |
| 6,252,629 B1 | * | 6/2001 | Takatori ...................... 348/460 |
| 6,279,034 B1 | * | 8/2001 | Jarriel et al. ................. 709/223 |

(Continued)

FOREIGN PATENT DOCUMENTS

DE 296 20 142 U1 11/1996

(Continued)

OTHER PUBLICATIONS

Internet Engineering Task Force Document RFC 1305—Network Time Protocol (Version 3) Specification, Implementation and Analysis.*

*Primary Examiner*—William Vaughn
*Assistant Examiner*—Greg Bengzon

(57) ABSTRACT

A time managing apparatus that manages times clocked by a plurality of timer modules in apparatuses connected to each other on a network. The time managing apparatus has: a holding means for holding event start time information that indicates an event start time at which one or more events should be started by two or more apparatuses on the network; a time requesting means for requesting a timer module to transmit a standard time; a time receiving means for receiving the standard time; a judging means for judging whether the event start time is reached, by comparing the received standard time with the event start time; and an instructing means for instructing the two or more apparatuses to start executing the one or more events when the judging means judges that the event start time is reached.

12 Claims, 31 Drawing Sheets

U.S. PATENT DOCUMENTS

| | | |
|---|---|---|
| 6,370,161 B1 * | 4/2002 | Ehrlich et al. ............... 370/516 |
| 6,378,000 B1 * | 4/2002 | Akatsu et al. ............... 709/245 |
| 6,446,082 B1 * | 9/2002 | Arita ........................ 707/104.1 |
| 6,529,526 B1 * | 3/2003 | Schneidewend ............ 370/486 |
| 6,535,926 B1 * | 3/2003 | Esker ........................ 709/248 |
| 6,546,419 B1 * | 4/2003 | Humpleman et al. ........ 709/223 |
| 6,581,110 B1 * | 6/2003 | Harif et al. ................. 709/248 |
| 6,742,048 B1 * | 5/2004 | Walsh ........................ 709/248 |
| 6,748,451 B2 * | 6/2004 | Woods et al. ............... 709/248 |
| 6,788,980 B1 * | 9/2004 | Johnson ........................ 700/1 |
| 7,003,791 B2 * | 2/2006 | Mizutani ..................... 725/21 |
| 2002/0044764 A1 | 4/2002 | Akamatsu et al. |
| 2002/0069299 A1 * | 6/2002 | Rosener et al. ............. 709/248 |
| 2003/0106071 A1 | 6/2003 | Akamatsu et al. |
| 2005/0055717 A1 * | 3/2005 | Daniels ....................... 725/58 |

FOREIGN PATENT DOCUMENTS

| | | |
|---|---|---|
| DE | 196 52 617 C1 | 12/1996 |
| JP | 06-334542 | 12/1994 |
| JP | 8-294083 | 11/1996 |
| JP | 10-145251 | 5/1998 |
| JP | 10-145695 | 5/1998 |
| JP | 11-126193 | 5/1999 |
| JP | 11-177919 | 7/1999 |
| WO | WO 81/03233 | 11/1981 |

* cited by examiner

FIG. 2

| TIMER ID | IP ADDRESS | SYNC FLAG | SYNC FLAG |
|---|---|---|---|
| (01:01) | (10:00:00:00) | BROADCASTING STA. A | OFF |
| (03:01) | (20:00:00:00) | BROADCASTING STA. B | ON |
| ⋮ | ⋮ | ⋮ | ⋮ |

TIMER MANAGEMENT TABLE ~101

FIG. 3

| TIMER MANAGEMENT TABLE | | | |
|---|---|---|---|
| TIMER ID | IP ADDRESS | SYNC OBJECT | SYNC FLAG |
| (02:01) | (30:00:00:00) | BROADCASTING STA. C | OFF |
| (02:02) | (40:00:00:00) | BROADCASTING STA. D | ON |
| (04:01) | (50:00:00:00) | BROADCASTING STA. E | OFF |
| ... | NONE | NONE | OFF |
| ... | ... | ... | ... |

TIMER PRESETTING TABLE 202

| TIMER ID | MODULE ID | START TIME | STOP TIME | START COMMAND | STOP COMMAND |
|----------|-----------|------------|-----------|---------------|--------------|
| (03:01) | (01:10) | 3/20 21:00:00 | 3/20 23:00:00 | (01:10)::Play,5CH (02:10)::Rec | (01:10)::Stop (02:10)::Stop |
| ... | ... | ... | ... | ... | ... |

FIG. 16

| MARK | SOURCE INFORMATION |
|---|---|
| A | clock.osaka-u.ac.jp |
| B | http://www.time.ne.jp |
| C | CS5CH |
| D | 02:01 |

FIG. 17A

INDIVIDUAL TIMER PRESETTING TABLE — 203

| MARK | MODULE ID | START TIME | STOP TIME | START EVENT | STOP EVENT |
|---|---|---|---|---|---|
| B | (02:12) | 3/20 21:00:00 | 3/20 23:00:00 | Play,5CH | Stop |
| ... | ... | ... | ... | ... | ... |

FIG. 17B

INDIVIDUAL TIMER PRESETTING TABLE — 204

| MARK | MODULE ID | START TIME | STOP TIME | START EVENT | STOP EVENT |
|---|---|---|---|---|---|
| B | (02:12) | 3/20 21:00:00 | 3/20 23:00:00 | Rec | Stop |
| ... | ... | ... | ... | ... | ... |

FIG. 24A

INDIVIDUAL TIMER PRESETTING TABLE (205)

| TIME DIFFERENCE | START TIME | STOP TIME | START EVENT | STOP EVENT |
|---|---|---|---|---|
| 03:12:55 | 3/20 21:00:00 | 3/20 23:00:00 | Play,5CH | Stop |
| ... | ... | ... | ... | ... |

FIG. 24B

INDIVIDUAL TIMER PRESETTING TABLE (206)

| TIME DIFFERENCE | START TIME | STOP TIME | START EVENT | STOP EVENT |
|---|---|---|---|---|
| -01:25:12 | 3/20 21:00:00 | 3/20 23:00:00 | Rec | Stop |
| ... | ... | ... | ... | ... |

FIG. 29A

| CHANNEL NO. | STANDARD TIME SELECTION | START TIME | STOP TIME | RECEIVING-SIDE MODULE | RECORDING-SIDE MODULE |
|---|---|---|---|---|---|
| 5CH | BROADCASTING STATION A / BROADCASTING STATION B / ... | 3/20 21:00:00 | 3/20 23:00:00 | ○○○… ×××… △△△… | ●… ■ ▶… ◀ ★ … ■ |

[ENTER]

FIG. 29B

| CHANNEL NO. | STANDARD TIME | START TIME | STOP TIME | RECEIVING-SIDE MODULE | RECORDING-SIDE MODULE |
|---|---|---|---|---|---|
| 5CH | BROADCASTING STATION B | 3/20 21:00:00 | 3/20 23:00:00 | ○○○… ×××… △△△… | ●… ■ ▲ ▶… ★ ■ |

IS IT OK TO USE STANDARD TIME OF BROADCASTING STATION B ?  [Yes]  [No]

US 7,281,061 B2

TIME MANAGING APPARATUS FOR MANAGING TIME TO SYNCHRONIZE WITH OTHER APPARATUSES

BACKGROUND OF THE INVENTION (1) Field of the Invention

The present invention relates to a time managing apparatus that manages times clocked by a plurality of apparatuses on a network, and specifically to a technique for synchronizing a plurality of apparatuses in terms of the time or execution of an event.

(2) Description of the Related Art

FIG. 31 shows a conventional network structure, where a plurality of apparatuses are connected to the network. As shown in FIG. 31, a set-top box (STB) 91, a personal computer (PC) 92 being a controller, a tuner 93, and a video tape recorder (VTR) 94 being a target apparatus are connected to a network 95 so that they can communicate with each other.

The PC 92 can synchronize in terms of the time with an internet broadcasting station 96 by communicating with it. The tuner 93 can synchronize in terms of the time with a broadcasting station 97 by receiving broadcasting data from it.

Each controller can control the target apparatuses.

Suppose the user presets a recording of a TV program using the PC 92. When the preset start time is reached, the PC 92 transmits a Play command to the tuner 93 to start receiving the TV program, and at the same time, the PC 92 transmits a Rec command to the VTR 94 to start recording the received TV program. When the preset stop time is reached, the PC 92 transmits a Stop command to the tuner 93 and the VTR 94 to stop the operations.

Here, each of the above apparatuses has a time managing unit and clocks the time separately. For this reason, when a plurality of apparatuses try to execute a certain event simultaneously, the start time or the stop time may be different for each apparatus.

This may cause the following problem, for example. Suppose the time clocked by the PC 92 is delayed from the tuner 93 that is synchronizing with the broadcasting station 97, and that the PC 92 is preset to record a TV program that is broadcast by the broadcasting station 97 and received via the tuner 93. Then when the PC 92 starts recording the preset TV program, the broadcasting station 97 has already started broadcasting the TV program, and the PC 92 fails to record the first part of the TV program.

SUMMARY OF THE INVENTION

The object of the present invention is therefore to provide a time managing apparatus that manages times clocked by a plurality of apparatuses on a network, and specifically to a technique for synchronizing a plurality of apparatuses in terms of the time or execution of an event.

1) The above object is fulfilled by a time managing apparatus that manages times clocked by a plurality of timer modules in apparatuses connected to each other on a network, the time managing apparatus comprising: a holding means for holding event start time information that indicates an event start time at which one or more events should be started by two or more apparatuses on the network; a time requesting means for requesting a timer module to transmit a standard time; a time receiving means for receiving the standard time; a judging means for judging whether the event start time is reached, by comparing the received standard time with the event start time; and an instructing means for instructing the two or more apparatuses to start executing the one or more events when the judging means judges that the event start time is reached.

With the above-described construction, the standard time is used to judge whether the event start time is reached, and when the event start time is reached, all apparatuses that are to execute the event are informed of the start time so that they can start executing the event simultaneously. Accordingly, it is possible to synchronize a plurality of apparatuses in terms of operation even if the times managed by the plurality of apparatuses are not synchronized.

2) In the above time managing apparatus of 1), the holding means may hold presetting information which contains, as a pair, the event start time information and a module identifier of the timer module, and the time requesting means requests the timer module having the module identifier to transmit the standard time.

With the above-described construction, the presetting information contains a module identifier of a time module that provides the standard time. Accordingly, it is possible to synchronize a plurality of apparatuses in terms of the start of an event, using a time of a certain timer module as a standard time.

3) In the above time managing apparatus of 2), when the judging means judges that the event start time is reached, the instructing means transmits triggers [for the one or more events] to the two or more apparatuses so that the two or more apparatuses start executing the one or more events simultaneously.

With the above-described construction, triggers are output when the event start time is reached. This enables a plurality of apparatuses to operate simultaneously.

4) in the above time managing apparatus of 2), the presetting information may further contain, for each event, (a) event type information indicating an event type and (b) an apparatus identifier of an apparatus that should execute the event, and when the judging means judges that the event start time is reached, the instructing means transmits pieces of event type information corresponding to the one or more events to apparatuses having apparatus identifiers corresponding to the one or more events so that the apparatuses start executing the one or more events simultaneously.

With the above-described construction, it is possible to transmit a piece of type information to a corresponding apparatus that is identified by the apparatus identifier when the event start time is reached. This enables any event to be executed by any apparatus.

5) The above time managing apparatus of 4) further comprising: a presetting information receiving means for receiving presetting information from outside and getting the holding means to hold the received presetting information; and a module identifier storage means for storing module identifiers by correlating the module identifiers with at least one of event type information and apparatus identifiers, the module identifiers being received by the presetting information receiving means together with the presetting information, wherein if the presetting information receiving means receives at least one of a piece of event type information and an apparatus identifier together with the presetting information, the presetting information receiving means searches the module identifier storage means for a module identifier that correlates with the received piece of event type information and/or apparatus identifier, and if the presetting information receiving means finds such a module identifier, the presetting information receiving means allows the found module identifier to be selected automatically.

With the above-described construction, it is possible to store a once-received module identifier and allow the stored module identifier to be selected automatically. This saves the user from having to input a module identifier each time the user selects a module.

6) The above object is also achieved by a time managing apparatus that manages times clocked by a plurality of timer modules in apparatuses connected to each other on a network, the time managing apparatus comprising: a presetting information receiving means for receiving from outside (a) event start time information that indicates an event start time at which one or more events should be started by two or more apparatuses on the network, (b) event type information indicating an event type for each of the one or more events, and (c) apparatus identifiers of apparatuses that should execute the one or more events; a time receiving means for receiving a standard time from a timer module; a time managing means for managing the received standard time; a presetting information transmitting means for transmitting the received event start time and event type information to the apparatuses identified by the received apparatus identifiers; a standard time acquisition request receiving means for receiving a standard time acquisition request from each of the apparatuses; and a standard time transmitting means for transmitting the standard time to each of the apparatuses.

With the above-described construction, it is possible to vicariously manage times for a plurality of timer modules, and to use any of the times as the standard time. Accordingly, it is possible to synchronize a plurality of apparatuses in terms of the start of an event, using a time of a certain timer module as a standard time.

7) In the above time managing apparatus of 6), the time managing means may manage the times clocked by the plurality of timer modules using different pieces of management information assigned to the plurality of timer modules, the presetting information receiving means further receives a piece of management information that corresponds to the received event start time, the time receiving means receives a standard time from a timer module corresponding to the received piece of management information, the presetting information transmitting means further transmits the received piece of management information to the apparatuses, the standard time acquisition request receiving means receives a standard time acquisition request and a piece of management information attached to the standard time acquisition request, from each of the apparatuses, and the standard time transmitting means transmits, to each of the apparatuses, the standard time received from the timer module corresponding to the received piece of management information.

With the above-described construction, a plurality of times are managed using management information assigned to the plurality of times respectively; a piece of management information for an event start time is received; a time acquisition request with a piece of management information is received from an apparatus that should execute the event; and a time identified by the piece of management information is then transmitted. Accordingly, it is possible to synchronize a plurality of apparatuses in terms of the start of an event, using a time of a certain timer module as a standard time.

8) The above time managing apparatus of 7) may further comprise: a time output requesting means for requesting the timer module corresponding to the received piece of management information to output the standard time, wherein the time receiving means receives the standard time from the timer module requested by the time output requesting means to output the standard time.

With the above-described construction, it is possible to request a timer module corresponding to the piece of management information to output a time. This enables the user to select a timer module.

9) The time managing apparatus of 8) may further comprise: a management information storage means for storing the piece of management information received by the presetting information receiving means, by correlating the piece of management information with at least one of apiece of event type information and two or more apparatus identifiers, wherein if the presetting information receiving means receives at least one of a piece of event type information and an apparatus identifier, the presetting information receiving means searches the management information storage means for a piece of management information that correlates with the received piece of event type information and/or apparatus identifier, and if the presetting information receiving means finds such a piece of management information, the presetting information receiving means allows the found piece of management information to be selected automatically.

With the above-described construction, it is possible to store a once-received piece of management information and allow the stored piece of management information to be selected automatically. This saves the user from having to input management information.

10) The above object is also fulfilled by a time managing apparatus that manages times clocked by a plurality of timer modules in apparatuses connected to each other on a network, the time managing apparatus comprising: a presetting information receiving means for receiving from outside (a) event start time information that indicates an event start time at which one or more events should be started by two or more apparatuses on the network, (b) a module identifier of a timer module, (c) event type information indicating an event type for each of the one or more events, and (d) apparatus identifiers of apparatuses that should execute the one or more events; a time output requesting means for requesting the timer module identified by the received module identifier to output a standard time; a time receiving means for receiving the standard time from the timer module; and a presetting information transmitting means for transmitting the received event start time and event type information, and transmitting the standard time to the apparatuses identified by the received apparatus identifiers.

With the above-described construction, the time managing apparatus receives a module identifier of a time module that provides the standard time, and transmits the standard time, the received event start time and type information to apparatuses that are to execute the event. Accordingly, it is possible to synchronize a plurality of apparatuses in terms of the start of an event, using a time of a certain timer module as a standard time.

11) The time managing apparatus of 10) may further comprise: module identifier storage means for storing the received module identifier by correlating the module identifier with at least one of a piece of event type information and two or more apparatus identifiers, wherein if the presetting information receiving means receives at least one of a piece of event type information and an apparatus identifier, the presetting information receiving means searches the module identifier storage means for a module identifier that correlates with the received piece of event type information and/or apparatus identifier, and if the presetting information receiving means finds such a module identifier, the presetting information receiving means allows the found module identifier to be selected automatically.

With the above-described construction, it is possible to store a once-received module identifier and allow the stored module identifier to be selected automatically. This saves the user from having to input a module identifier each time the user selects a module.

12) The above object is also fulfilled by a time managing apparatus that manages times clocked by a plurality of timer modules in apparatuses connected to each other on a network, the time managing apparatus comprising: a designation receiving means for receiving designation by a user of a timer module among the plurality of timer modules, the timer module being to be used as a standard timer module for synchronization; a time requesting means for requesting the designated timer module to output a standard time; a time receiving means for receiving the standard time from the requested timer module; and a time transmitting means for transmitting the received standard time to the other timer modules among the plurality of timer modules excluding the timer module that output the standard time, instructing the other timer modules to synchronize times thereof with the transmitted standard time.

With the above-described construction, it is possible to synchronize the times of timer modules with the time of the user-selected timer module. This enables apparatuses on the network to synchronize with each other in terms of the operation even if the times managed by the apparatuses do not synchronize.

13) The above object is also fulfilled by a time managing apparatus that manages times clocked by a plurality of timer modules in apparatuses connected to each other on a network, the time managing apparatus comprising: a presetting information receiving means for receiving (a) event start time information that indicates an event start time at which one or more events should be started by two or more apparatuses on the network, (b) a piece of management information, and (c) event type information indicating an event type for each of the one or more events, from an apparatus that vicariously manages the times clocked by the plurality of timer modules using different pieces of management information assigned to the plurality of timer modules; a holding means for holding the received event start time, piece of management information, and event type information; a time acquisition request transmitting means for transmitting to the apparatus a time acquisition request with the received piece of management information attached thereto; a time receiving means for receiving from the apparatus a standard time identified by the transmitted piece of management information; a judging means for judging whether the event start time is reached by comparing the received standard time with the event start time; and an executing means for starting to execute an event that is indicated by the event type information held by the holding means when the judging means judges that the event start time is reached.

With the above-described construction, it is possible to continuously acquire a time from another apparatus that vicariously manages times for a plurality of timer modules, and to use the acquired time as the standard time. Accordingly, it is possible to synchronize a plurality of apparatuses in terms of the start of an event, using a time of a certain timer module as a standard time. 14) The above object is also fulfilled by a time managing apparatus that manages times clocked by a plurality of timer modules in apparatuses connected to each other on a network, the time managing apparatus comprising: a time clocking means for clocking a local time for the time managing apparatus itself; a presetting information receiving means for receiving (a) event start time information that indicates an event start time at which one or more events should be started by two or more apparatuses on the network, (b) event type information indicating an event type for each of the one or more events, from an apparatus on the network, the presetting information receiving means also continuously receiving a standard time from a time module; a time difference calculating means for calculating a time difference between the local time received from the time clocking means and the standard time; a holding means for holding the received event start time and type information and the calculated time difference; a judging means for judging whether the event start time is reached by receiving the local time from the time clocking means, acquiring a corrected time using the received local time and the time difference, and comparing the continuously acquired corrected time with the event start time; and an executing means for starting to execute an event that is indicated by the event type information held by the holding means when the judging means judges that the event start time is reached.

With the above-described construction, each apparatus can have a corrected time by holding a time difference between a standard time and a time of the apparatus itself. Accordingly, it is possible to synchronize a plurality of apparatuses in terms of the start of an event, using a time of a certain timer module as a standard time.

15) The above object is also fulfilled by a time managing method for a time managing apparatus that manages times clocked by a plurality of timer modules in apparatuses connected to each other on a network, the time managing apparatus comprising a holding means for holding event start time information that indicates an event start time at which one or more events should be started by two or more apparatuses on the network, and the time managing method comprising: a time requesting step for requesting a timer module to transmit a standard time; a time receiving step for receiving the standard time; a judging step for judging whether the event start time is reached, by comparing the received standard time with the event start time; and an instructing step for instructing the two or more apparatuses to start executing the one or more events when the judging step judges that the event start time is reached.

With the above-described construction, the standard time is used to judge whether the event start time is reached, and when the event start time is reached, all apparatuses that are to execute the event are informed of the start time so that they can start executing the event simultaneously. Accordingly, it is possible to synchronize a plurality of apparatuses in terms of operation even if the times managed by the plurality of apparatuses are not synchronized.

16) The above object is also fulfilled by a time managing method for a time managing apparatus that manages times clocked by a plurality of timer modules in apparatuses connected to each other on a network, the time managing method comprising: a presetting information receiving step for receiving from outside (a) event start time information that indicates an event start time at which one or more events should be started by two or more apparatuses on the network, (b) event type information indicating an event type for each of the one or more events, and (c) apparatus identifiers of apparatuses that should execute the one or more events; a time receiving step for receiving a standard time from a timer module; a time managing step for managing the received standard time; a presetting information transmitting step for transmitting the received event start time and event type information to the apparatuses identified by the received apparatus identifiers; a standard time acquisition request receiving step for receiving a standard time acquisition request from each of the apparatuses; and standard time transmitting step for transmitting the standard time to each of the apparatuses.

With the above-described construction, it is possible to vicariously manage times for a plurality of timer modules, and to use any of the times as the standard time. Accordingly, it is possible to synchronize a plurality of apparatuses in terms of the start of an event, using a time of a certain timer module as a standard time.

17) The above object is also fulfilled by a time managing method for a time managing apparatus that manages times clocked by a plurality of timer modules in apparatuses connected to each other on a network, the time managing method comprising: a presetting information receiving step for receiving from outside (a) event start time information that indicates an event start time at which one or more events should be started by two or more apparatuses on the network, (b) a module identifier of a timer module, (c) event type information indicating an event type for each of the one or more events, and (d) apparatus identifiers of apparatuses that should execute the one or more events; a time output requesting step for requesting the timer module identified by the received module identifier to output a standard time; a time receiving step for receiving the standard time from the timer module; and a presetting information transmitting step for transmitting the received event start time and event type information, and transmitting the standard time, to the apparatuses identified by the received apparatus identifiers.

With the above-described construction, the time managing apparatus receives a module identifier of a time module that provides the standard time, and transmits the standard time, the received event start time and type information to apparatuses that are to execute the event. Accordingly, it is possible to synchronize a plurality of apparatuses in terms of the start of an event, using a time of a certain timer module as a standard time.

18) The above object is also fulfilled by a time managing method for a time managing apparatus that manages times clocked by a plurality of timer modules in apparatuses connected to each other on a network, the time managing method comprising: designation receiving step for receiving designation by a user of a timer module among the plurality of timer modules, the timer module being to be used as a standard timer module for synchronization; a time requesting step for requesting the designated timer module to output a standard time; a time receiving step for receiving the standard time from the requested timer module; and a time transmitting step for transmitting the received standard time to the other timer modules among the plurality of timer modules excluding the timer module that output the standard time, instructing the other timer modules to synchronize times thereof with the transmitted standard time.

With the above-described construction, it is possible to synchronize the times of timer modules with the time of the user-selected timer module. This enables apparatuses on the network to synchronize with each other in terms of the operation even if the times managed by the apparatuses do not synchronize.

19) The above object is also fulfilled by a time managing method for a time managing apparatus that manages times clocked by a plurality of timer modules in apparatuses connected to each other on a network, the time managing method comprising: a presetting information receiving step for receiving (a) event start time information that indicates an event start time at which one or more events should be started by two or more apparatuses on the network, (b) a piece of management information, and (c) event type information indicating an event type for each of the one or more events, from an apparatus that vicariously manages the times clocked by the plurality of timer modules using different pieces of management information assigned to the plurality of timer modules; a holding step for holding the received event start time, piece of management information, and event type information; a time acquisition request transmitting step for transmitting to the apparatus a time acquisition request with the received piece of management information attached thereto; a time receiving step for receiving from the apparatus a standard time identified by the transmitted piece of management information; a judging step for judging whether the event start time is reached by comparing the received standard time with the event start time; and an executing step for starting to execute an event that is indicated by the event type information held by the holding step when the judging step judges that the event start time is reached.

With the above-described construction, it is possible to continuously acquire a time from another apparatus that vicariously manages times for a plurality of timer modules, and to use the acquired time as the standard time. Accordingly, it is possible to synchronize a plurality of apparatuses in terms of the start of an event, using a time of a certain timer module as a standard time.

20) The above object is also fulfilled by a time managing method for a time managing apparatus that manages times clocked by a plurality of timer modules in apparatuses connected to each other on a network, the time managing apparatus comprising a time clocking means for clocking a local time for the time managing apparatus itself, and the time managing method comprising: a presetting information receiving step for receiving (a) event start time information that indicates an event start time at which one or more events should be started by two or more apparatuses on the network, (b) event type information indicating an event type for each of the one or more events, from an apparatus on the network, the presetting information receiving step also continuously receiving a standard time from a time module; a time difference calculating step for calculating a time difference between the local time received from the time clocking means and the standard time; a holding step for holding the received event start time and type information and the calculated time difference; a judging step for judging whether the event start time is reached by receiving the local time from the time clocking means, acquiring a corrected time using the received local time and the time difference, and comparing the continuously acquired corrected time with the event start time; and an executing step for starting to execute an event that is indicated by the event type information held by the holding means when the judging means judges that the event start time is reached.

With the above-described construction, each apparatus can have a corrected time by holding a time difference between a standard time and a time of the apparatus itself. Accordingly, it is possible to synchronize a plurality of apparatuses in terms of the start of an event, using a time of a certain timer module as a standard time.

21) The above object is also fulfilled by a time managing program for a time managing apparatus that manages times clocked by a plurality of timer modules in apparatuses connected to each other on a network, the time managing apparatus comprising a holding means for holding event start time information that indicates an event start time at which one or more events should be started by two or more apparatuses on the network, and the time managing program allowing the time managing apparatus to execute the following steps: a time requesting step for requesting a timer module to transmit a standard time; a time receiving step for receiving the standard time; a judging step for judging whether the event start time is reached, by comparing the received standard time with the event start time; and an instructing step for instructing the two or more apparatuses to start executing the one or more events when the judging step judges that the event start time is reached.

With the above-described construction, the standard time is used to judge whether the event start time is reached, and when the event start time is reached, all apparatuses that are to execute the event are informed of the start time so that they can start executing the event simultaneously. Accordingly, it is possible to synchronize a plurality of apparatuses in terms of operation even if the times managed by the plurality of apparatuses are not synchronized.

22) The above object is also fulfilled by a time managing program for a time managing apparatus that manages times clocked by a plurality of timer modules in apparatuses connected to each other on a network, the time managing program allowing the time managing apparatus to execute the following steps: a presetting information receiving step for receiving from outside (a) event start time information that indicates an event start time at which one or more events should be started by two or more apparatuses on the network, (b) event type information indicating an event type for each of the one or more events, and (c) apparatus identifiers of apparatuses that should execute the one or more events; a time receiving step for receiving a standard time from a timer module; a time managing step for managing the received standard time; a presetting information transmitting step for transmitting the received event start time and event type information to the apparatuses identified by the received apparatus identifiers; a standard time acquisition request receiving step for receiving a standard time acquisition request from each of the apparatuses; and a standard time transmitting step for transmitting the standard time to each of the apparatuses.

With the above-described construction, it is possible to vicariously manage times for a plurality of timer modules, and to use any of the times as the standard time. Accordingly, it is possible to synchronize a plurality of apparatuses in terms of the start of an event, using a time of a certain timer module as a standard time.

23) The above object is also fulfilled by a time managing program for a time managing apparatus that manages times clocked by a plurality of timer modules in apparatuses connected to each other on a network, the time managing program allowing the time managing apparatus to execute the following steps: a presetting information receiving step for receiving from outside (a) event start time information that indicates an event start time at which one or more events should be started by two or more apparatuses on the network, (b) a module identifier of a timer module, (c) event type information indicating an event type for each of the one or more events, and (d) apparatus identifiers of apparatuses that should execute the one or more events; a time output requesting step for requesting the timer module identified by the received module identifier to output a standard time; a time receiving step for receiving the standard time from the timer module; and a presetting information transmitting step for transmitting the received event start time and event type information, and transmitting the standard time, to the apparatuses identified by the received apparatus identifiers.

With the above-described construction, the time managing apparatus receives a module identifier of a time module that provides the standard time, and transmits the standard time, the received event start time and type information to apparatuses that are to execute the event. Accordingly, it is possible to synchronize a plurality of apparatuses in terms of the start of an event, using a time of a certain timer module as a standard time.

24) The above object is also fulfilled by a time managing program for a time managing apparatus that manages times clocked by a plurality of timer modules in apparatuses connected to each other on a network, the time managing program allowing the time managing apparatus to execute the following steps: a designation receiving step for receiving designation by a user of a timer module among the plurality of timer modules, the timer module being to be used as a standard timer module for synchronization; a time requesting step for requesting the designated timer module to output a standard time; a time receiving step for receiving the standard time from the requested timer module; and a time transmitting step for transmitting the received standard time to the other timer modules among the plurality of timer modules excluding the timer module that output the standard time, instructing the other timer modules to synchronize times thereof with the transmitted standard time.

With the above-described construction, it is possible to synchronize the times of timer modules with the time of the user-selected timer module. This enables apparatuses on the network to synchronize with each other in terms of the operation even if the times managed by the apparatuses do not synchronize.

25) The above object is also fulfilled by a time managing program for a time managing apparatus that manages times clocked by a plurality of timer modules in apparatuses connected to each other on a network, the time managing program allowing the time managing apparatus to execute the following steps: a presetting information receiving step for receiving (a) event start time information that indicates an event start time at which one or more events should be started by two or more apparatuses on the network, (b) a piece of management information, and (c) event type information indicating an event type for each of the one or more events, from an apparatus that vicariously manages the times clocked by the plurality of timer modules using different pieces of management information assigned to the plurality of timer modules; a holding step for holding the received event start time, piece of management information, and event type information; a time acquisition request transmitting step for transmitting to the apparatus a time acquisition request with the received piece of management information attached thereto; a time receiving step for receiving from the apparatus a standard time identified by the transmitted piece of management information; a judging step for judging whether the event start time is reached by comparing the received standard time with the event start time; and an executing step for starting to execute an event that is indicated by the event type information held by the holding means when the judging step judges that the event start time is reached.

With the above-described construction, it is possible to continuously acquire a time from another apparatus that vicariously manages times for a plurality of timer modules, and to use the acquired time as the standard time. Accordingly, it is possible to synchronize a plurality of apparatuses in terms of the start of an event, using a time of a certain timer module as a standard time.

26) The above object is also fulfilled by a time managing program for a time managing apparatus that manages times clocked by a plurality of timer modules in apparatuses connected to each other on a network, the time managing apparatus comprising: a time clocking means for clocking a local time for the time managing apparatus itself, and the time managing program allowing the time managing apparatus to execute the following steps: a presetting information receiving step for receiving (a) event start time information that indicates an event start time at which one or more events should be started by two or more apparatuses on the network, (b) event type information indicating an event type for each of the one or more events, from an apparatus on the network, the presetting information receiving step also continuously receiving a standard time from a time module; a time difference calculating step for calculating a time difference between the local time received from the time clocking means and the standard time; a holding step for holding the received event start time and type information and the calculated time difference; a judging step for judging whether the event start time is reached by receiving the local time from the time clocking means, acquiring a corrected time using the received local time and the time difference, and comparing the continuously acquired corrected time with the event start time; and an executing step for starting to execute an event that is indicated by the event type information held by the holding means when the judging step judges that the event start time is reached.

With the above-described construction, each apparatus can have a corrected time by holding a time difference between a standard time and a time of the apparatus itself. Accordingly, it is possible to synchronize a plurality of apparatuses in terms of the start of an event, using a time of a certain timer module as a standard time.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 shows a timer management table stored in the timer management table storing unit 14;

FIG. 3 shows a timer management table stored in the timer management table storing unit 24;

FIG. 4 shows a timer presetting table stored in the timer presetting table storage unit 26;

FIG. 16 shows a vicarious time management table stored in the vicarious time management table storage unit 211;

FIG. 17A shows an individual timer presetting table stored in the individual timer presetting table storage unit 33;

FIG. 17B shows an individual timer presetting table stored in the individual timer presetting table storage unit 43;

FIG. 24A shows an individual timer presetting table stored in the individual timer presetting table storage unit 35;

FIG. 24B shows an individual timer presetting table stored in the individual timer presetting table storage unit 45;

FIG. 29A shows a recording presetting screen for receiving a recording presetting from the user;

FIG. 29B shows the recording presetting screen that is currently asking the user whether the user is to use a timer module that was once selected by the user and information of which has been stored;

DESCRIPTION OF THE PREFERRED EMBODIMENTS

Embodiment 1

Summary

A controller holds a module ID of a module that manages a standard time, for each preset event.

The controller reads the standard time for each preset event at regular intervals, and judges whether the read standard time matches the start time or the stop time of the preset event. When the standard time matches the start time, the controller instructs the target apparatus to start executing the preset event; and when the standard time matches the stop time, the controller instructs the target apparatus to stop executing the preset event.

The target apparatus starts and stops executing the preset event under control of the controller.

The controller also allows a plurality of times managed by different modules to be synchronized with the standard time.

Construction

Figure 1:
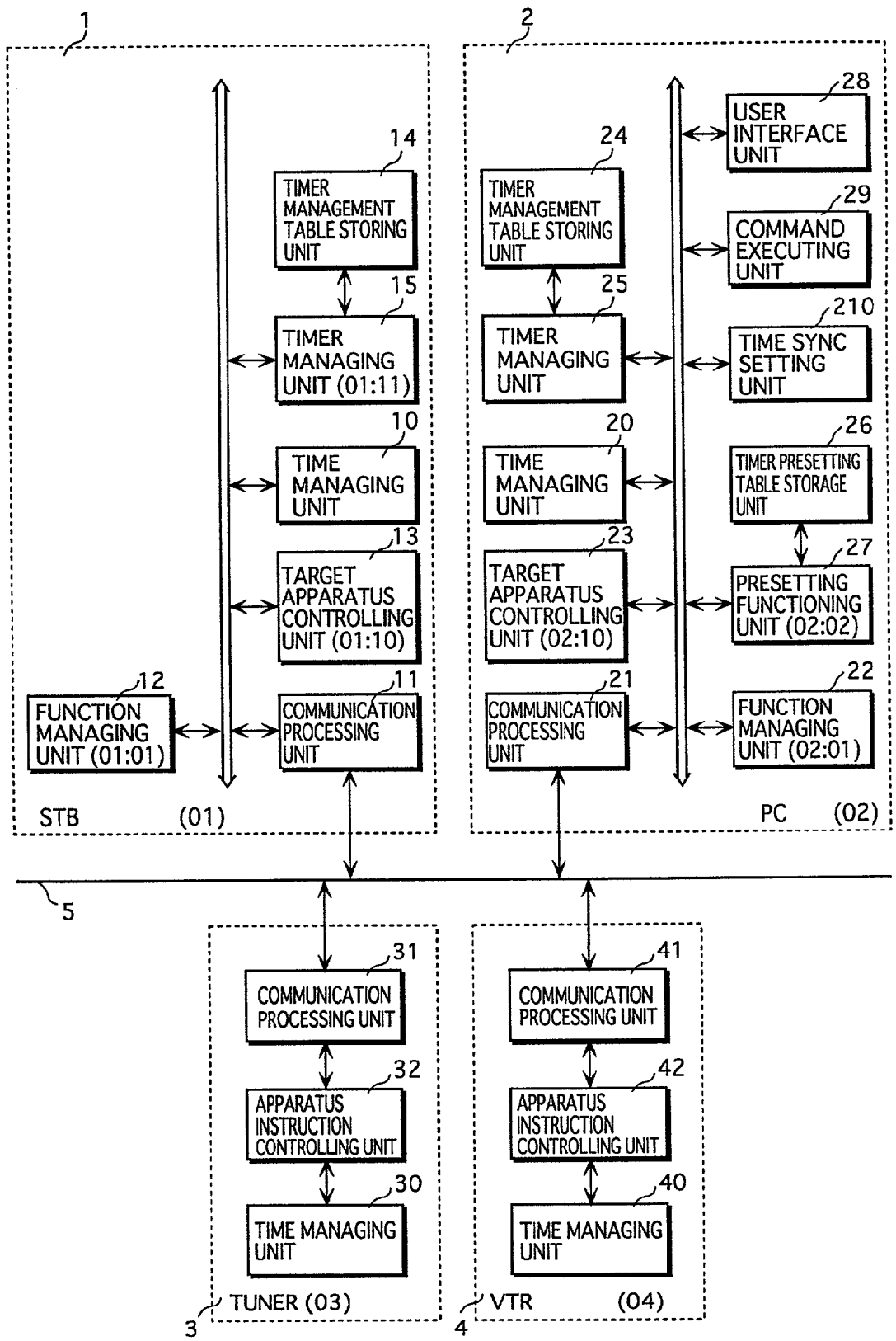
FIG. 1 shows the construction of a network to which a plurality of apparatuses relating to Embodiment 1 of the present invention are connected.

FIG. 1 shows the construction of a network to which a plurality of apparatuses relating to Embodiment 1 of the present invention are connected.

In FIG. 1, the STB 1 and the PC 2 are controllers, the tuner 3 and the VTR 4 are target apparatuses. The apparatuses 1 to 4 constitute the network 5 and can communicate with each other via the network 5.

The STB 1 is a set-top box that controls the tuner 3, and includes a time managing unit 10, a communication processing unit 11, a function managing unit 12, a target apparatus controlling unit 13, a timer management table storing unit 14, and a timer managing unit 15.

The PC 2 is a personal computer that controls the VTR 4, and includes a time managing unit 20, a communication processing unit 21, a function managing unit 22, a target apparatus controlling unit 23, a timer management table storing unit 24, a timer managing unit 25, a timer presetting table storage unit 26, a presetting functioning unit 27, a user interface unit 28, a command executing unit 29, and a time sync setting unit 210.

The tuner 3 is a receiving apparatus that receives broadcast data broadcast on a communication network different from the network 5, and includes a time managing unit 30, a communication processing unit 31, and an apparatus instruction controlling unit 32. It is supposed here that the tuner 3 receives TV programs that are broadcast by means of the terrestrial broadcasting or the satellite broadcasting.

The VTR 4 is a recording apparatus that records audio data and video data onto video tape, and includes a time managing unit 40, a communication processing unit 41, and an apparatus instruction controlling unit 42.

The network 5 is a communication medium such as a home network or a global network such as Internet, and may be any communication medium in so far as it enables apparatuses connected to it to communicate with each other.

Each of the STB 1, the PC 2, the tuner 3, and the VTR 4 is assigned with a different apparatus identifier (hereinafter referred to as ID), stores the ID of itself and IDs of the other apparatuses beforehand. It is supposed here that the STB 1 has apparatus ID "01", the PC 2 "02", the tuner 3 "03", and the VTR 4 "04".

Among the modules of the STB 1, modules that communicate with the PC 2 are assigned with different module IDs. It is supposed here that the function managing unit 12 has module ID "01:01", the target apparatus controlling unit 13 "01:10", and the timer managing unit 15 "01:11".

Among the modules of the PC 2, modules that communicate with the STB 1 are assigned with different module IDs. It is supposed here that the function managing unit 22 has module ID "02:01", the target apparatus controlling unit 23 "02:10", and the timer managing unit 25 "02:11".

The time managing units 10, 20, 30, and 40 also have different timer IDs. It is supposed here that the time managing unit 10 has timer ID "01:01", the time managing unit 20 has two timer IDs "02:01" and "02:02" for two timers it has, the time managing unit 30 "03:01", and the time managing unit 40 "04:01". Note that one apparatus may have a plurality of time managing units. Among the two numerals contained in each module ID and each timer ID, the first numeral matches the apparatus ID of the apparatus to which the module or timer belongs.

The time managing unit 10 is a timer module and manages the time for the STB 1.

The communication processing unit 11 is an interface module that controls communications between each module of the STB 1 and the network 5.

The function managing unit 12 stores and manages the functions of the modules constituting the STB 1 in correspondence with the module IDs. When receiving a module ID acquisition request from another module, the function managing unit 12 returns a module ID acquisition response with module IDs of the target apparatus controlling unit 13 and the timer managing unit 15.

The target apparatus controlling unit 13, when receiving from another module an instruction for an event for the tuner 3 that is a target apparatus of the STB 1, controls the tuner 3 by transmitting to the tuner 3 a request for an event specified in the received instruction; and when receiving a response from the tuner 3, the target apparatus controlling unit 13 transfers the received response to the requester.

The timer management table storing unit 14 is a portion of a recording apparatus such as a hard disk, and stores a timer management table. The timer management table is a table showing attributes of the timer modules, and for example, contains (1) timer IDs of the timer modules that can acquire the present time, (2) IP addresses of the objects with which the timer modules synchronize, (3) names of the objects synchronizing with the timer modules, and (4) sync flags, each of which shows "ON" indicating "in sync" or "OFF" indicating "out of sync".

FIG. 2 shows a timer management table stored in the timer management table storing unit 14.

The timer managing unit 15 manages the timer management table 101 stored in the timer management table storing unit 14.

The time managing unit 20 is a timer module and manages the time for the PC 2.

The communication processing unit 21 is an interface module that controls communications between each module of the PC 2 and the network 5.

The function managing unit 22 stores and manages the functions of the modules constituting the PC 2 in correspondence with the module IDs. When receiving a module ID acquisition request from another module, the function managing unit 22 returns a module ID acquisition response with module IDs of the target apparatus controlling unit 23 and the timer managing unit 25.

The target apparatus controlling unit 23, when receiving from another module an instruction for an event for the VTR 4 that is a target apparatus of the PC 2, controls the VTR 4 by transmitting to the VTR 4 a request for an event specified in the received instruction; and when receiving a response from the VTR 4, the target apparatus controlling unit 23 transfers the received response to the requester.

The timer management table storing unit 24 is a portion of a recording apparatus such as a hard disk, and stores a timer management table.

FIG. 3 shows a timer management table stored in the timer management table storing unit 24.

The timer managing unit 25 manages the timer management table 201 stored in the timer management table storing unit 24.

The timer presetting table storage unit 26 stores a timer presetting table. The timer presetting table contains: a timer ID of a time managing unit that manages a standard time that is to be referred to during the presetting process; a module ID of a module to which the present time is requested; a start time that triggers a start command to be executed; a stop time that triggers a stop command to be executed; a start command that shows a certain type of event to be executed at the start time; and a stop command that specifies a certain type of event to be executed at the stop time. Note that each of the start command and the stop command is attached with a module ID of a module that is the object of the event specified by the command.

FIG. 4 shows a timer presetting table stored in the timer presetting table storage unit 26.

The timer presetting table 202 shown in FIG. 4 has the following contents. The "timer ID" column shows a timer ID of a timer module that manages the standard time, and in this example, the time managing unit 30 having the timer ID "03:01" manages the standard time. The "module ID" column shows a module ID of a module to which a current time acquisition request should be transmitted, and in this example, a current time acquisition request is to be transmitted to the target apparatus controlling unit 13 having the module ID "01:10". The "start time" and "stop time" columns show a start time and a stop time of an event, respectively. The "start command" column shows a start command to be used for the event, and in this example, two start commands are prepared. The start command "(01:10):: Play, 5CH" indicates that a start request should be sent to the target apparatus controlling unit 13 having the module ID "01:10" at the start time "21:00:00" so that the operation specified in this command can be started. The start command "(02:10)::Rec" indicates that a start request should be sent to the target apparatus controlling unit 23 having the module ID "02:10" at the start time "21:00:00" so that the operation specified in this command can be started. The stop command "(01:10): Stop" indicates that a stop request should be sent to the target apparatus controlling unit 13 having the module ID "01:10" at the stop time "23:00:00". The stop command "(02:10)::Stop" indicates that a stop request should be sent to the target apparatus controlling unit 23 having the module ID "02:10" at the stop time "23:00:00".

The presetting functioning unit 27 manages the timer presetting table and executes the preset operations. More particularly, each time it receives from the user a specification of an operation to be preset, the presetting functioning unit 27 records the specified operation into the timer presetting table as a preset operation, and executes each preset operation by continuously acquiring the present time from the time managing unit with the timer ID specified in the timer presetting table, transmitting a start request based on the start command written in the timer presetting table when an acquired present time matches the start time, and transmitting a stop request based on the stop command written in the timer presetting table when an acquired present time matches the stop time.

The user interface unit 28 presents the user with various types of information, receives from the user various types of inputs, and issues various types of commands. When receiving an instruction to start presetting a recording, the user interface unit 28 issues a module ID acquisition command to acquire a module ID, after the acquisition of the module ID, presents a screen for recording presetting and urges the user to decide whether to select a timer module, receives from the user an input indicating to select a timer module, issues an attribute information acquisition command to acquire attribute information of the selected timer module, after the acquisition of the attribute information, presents a screen for selecting timer module, and receives, from the user, designation of a timer module the user has selected. When receiving an instruction to synchronize a plurality of time managing units, the user interface unit 28 issues a sync module ID acquisition command, acquires attribute information, presents a screen for selecting a timer module, receives, from the user, designation of a standard timer module and a timer module to be synchronized with the standard timer module, and issues a sync instruction command.

The command executing unit 29 executes the commands received from the user interface unit 28. When receiving the module ID acquisition command or the sync module ID acquisition command, the command executing unit 29 acquires the module IDs of the function managing units contained in all controllers existing on the network 5. When receiving the attribute information acquisition command, the command executing unit 29 acquires the attribute information.

The time sync setting unit 210 executes various sync instruction commands received from the user interface unit 28 and synchronizes the time managed by the timer modules in each apparatus with each other. More particularly, when receiving a sync instruction command, the time sync setting unit 210 acquires the current time from a standard timer module, transmits the acquired current time to the target timer modules so that the target timer modules are synchronized with each other.

The time managing unit 30 is a timer module, and manages the time for the tuner 3.

The communication processing unit 31 is an interface module that controls communications between each module of the tuner 3 and the network 5.

The apparatus instruction controlling unit 32, when receiving a current time acquisition request with a timer ID from a controller, acquires the current time from a timer module identified by the attached timer ID, sends the acquired current time to the controller. When receiving a current time setting request with a timer ID from a controller, the apparatus instruction controlling unit 32 sets the time managed by a timer module identified by the attached timer ID in accordance with the received current time setting request. When receiving a start request from a controller requesting to start a certain event, the apparatus instruction controlling unit 32 returns a start response and starts the requested event; and when receiving a stop request from a controller, the apparatus instruction controlling unit 32 returns a stop response and stops the currently executed event.

The time managing unit 40 is a timer module and manages the time for the VTR 4.

The communication processing unit 41 is an interface module that controls communications between each module of the VTR 4 and the network 5.

The apparatus instruction controlling unit 42, when receiving a current time acquisition request with a timer ID from a controller, acquires the current time from a timer module identified by the attached timer ID, sends the acquired current time to the controller. When receiving a current time setting request with a timer ID from a controller, the apparatus instruction controlling unit 42 sets the time managed by a timer module identified by the attached timer ID in accordance with the received current time setting request. When receiving a start request from a controller requesting to start a certain event, the apparatus instruction controlling unit 42 returns a start response and starts the requested event; and when receiving a stop request from a controller, the apparatus instruction controlling unit 42 returns a stop response and stops the currently executed event.

Operation

Figure 5:
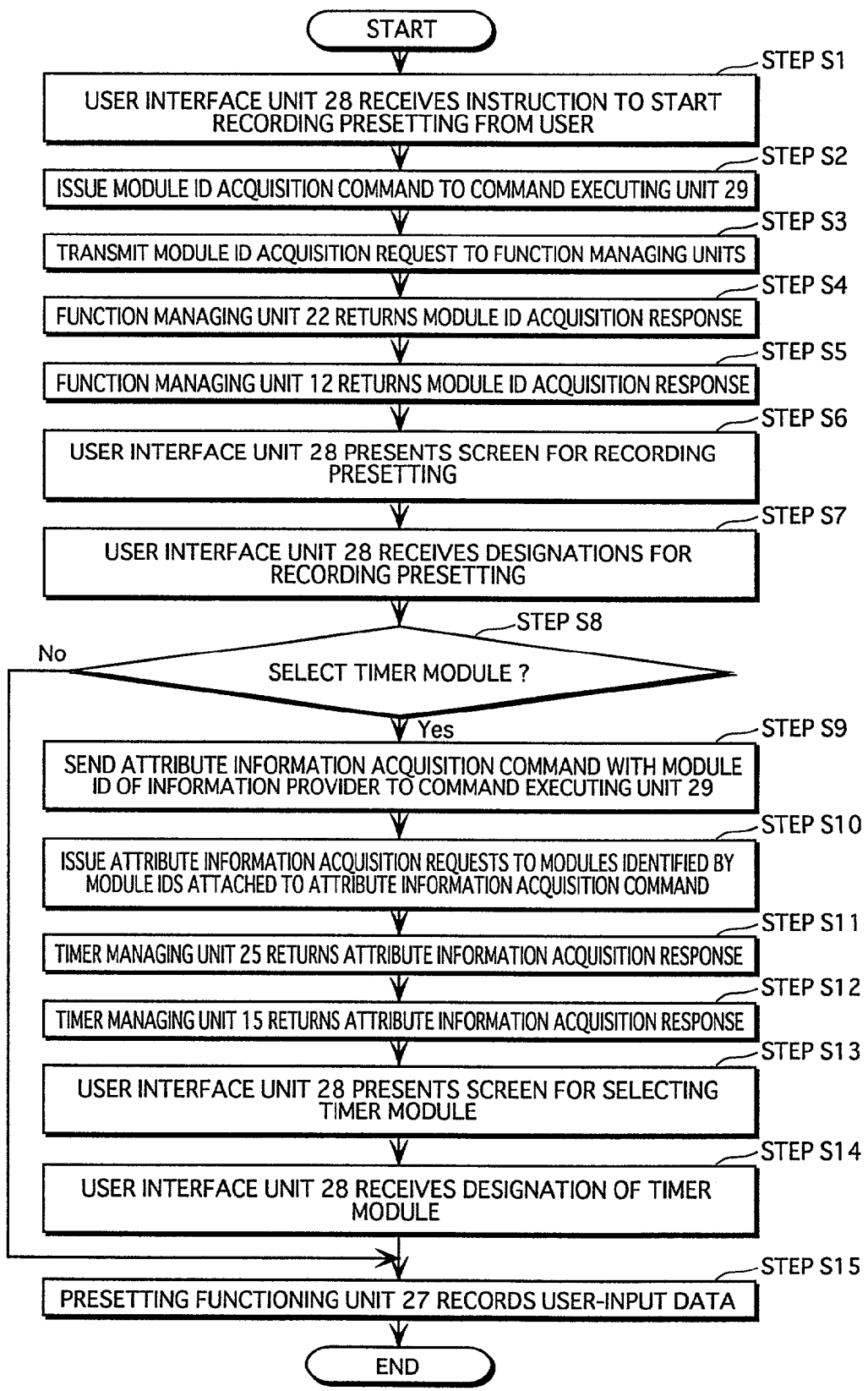
FIG. 5 shows a timer presetting procedure performed by the user using the PC 2.

FIG. 5 shows a timer presetting procedure performed by the user using the PC 2.

Now, an operation procedure of a recording presetting as an example of the timer presetting will be described with reference to FIG. 5.

Step S1

The user interface unit 28 of the PC 2 receives from the user an instruction to start a recording presetting.

Step S2

The user interface unit 28 issues a module ID acquisition command to the command executing unit 29 via an internal bus, where module ID acquisition command instructs to acquire module IDs of (a) a module that manages attribute information of the timer modules that independently clock time and (b) a module that can read the current time of each of the timer modules and can perform the timer presetting.

Step S3

The command executing unit 29 of the PC 2 transmits a module ID acquisition request to the function managing units contained in all controllers existing on the network 5. In this example, the command executing unit 29 transmits module ID acquisition request "C_GET_MODULEID_REQ(02:01)" to the function managing unit 22 of the PC 2, and transmits module ID acquisition request "C_GET_MODULEID_REQ(01:01)" to the function managing unit 12 of the STB 1 under control of the communication processing unit 21.

Step S4

The function managing unit 22 of the PC 2, after receiving the module ID acquisition request "C_GET_MODULEID_REQ(02:01)", returns module ID acquisition response "C_GET_MODULEID_RSP (Timer Manage 02:11) (Target Control 02:10)" to the command executing unit 29, where in this example, the response "C_GET_MODULEID_RSP (Timer Manage 02:11) (Target Control 02:10)" contains module IDs of (a) the timer managing unit 25 that manages attribute information of the timer modules and (b) the target apparatus controlling unit 23 that can read the current time of each of the timer modules and can perform the timer presetting.

Step S5

The function managing unit 12 of the STB 1, after receiving the module ID acquisition request "C GET_MODULEID_REQ(01:01)" under control of the communication processing unit 11, returns module ID acquisition response "C GET_MODULEID_RSP (Timer Manage 01:11) (Target Control 01:10)" to the command executing unit 29, where in this example, the response "C GET_MODULEID_RSP (Timer Manage 01:11) (Target Control 01:10)" contains module IDs of (a) the timer managing unit 15 that manages attribute information of the timer modules and (b) the target apparatus controlling unit 13 that can read the current time of each of the timer modules and can perform the timer presetting. The command executing unit 29 receives the response under control of the communication processing unit 21 and sends it to the user interface unit 28.

Figure 6:
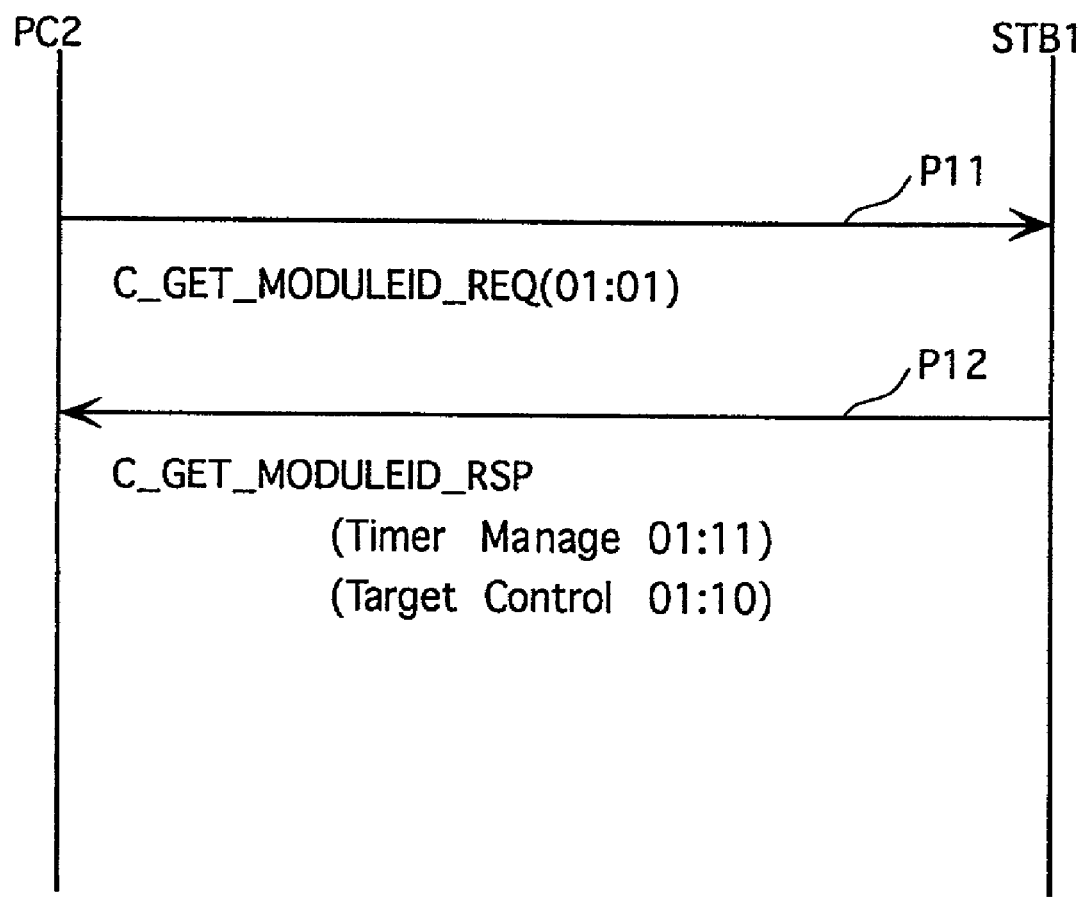
FIG. 6 shows transfer of a module ID acquisition request and a module ID acquisition response.

FIG. 6 shows transfer of a module ID acquisition request and a module ID acquisition response.

As shown in FIG. 6, the module ID acquisition request "C_GET_MODULEID_REQ(01:01)" is transmitted from the PC 2 to the STB 1 (the arrow P11 in FIG. 6), and the module ID acquisition response "C_GET_MODULEID_RSP (Timer Manage 01:11) (Target Control 01:10)" is returned to the PC 2 (the arrow P12 in FIG. 6).

Step S6

The user interface unit 28 presents a screen for recording presetting, based on the module ID acquisition response transferred in the steps S4 and S6, where the recording presetting screen contains (a) spaces in which the user is expected to fill in a recording start date and time, a recording stop date and time, and the number of a channel through which a recording target is provided and (b) spaces in which the user specifies modules out of receiving-side modules and recording-side modules which are a list of the modules that can perform the timer presetting, acquired from the module ID acquisition response.

Step S7

The user interface unit 28 receives designations for the recording presetting from the user. More particularly, the user (a) fills in a recording start date and time, a recording stop date and time, and the number of a recording channel and (b) selects a receiving-side module and a recording-side module. In this example, it is supposed that the user writes "3/20,21:00:00" as the recording start date and time, "3/20, 23:00:00" as the recording stop date and time, and "5CH" as the number of a recording channel, selects the target apparatus controlling unit 13 of the STB 1 as the receiving-side module, and selects the target apparatus controlling unit 23 of the PC 2 as the recording-side module.

Step S8

The user interface unit 28 urges the user to decide whether to select a timer module or enter the input contents without selecting a timer module. Here, if the user decides to enter the input contents without selecting a timer module, the control jumps to the step S15 to record the preset contents; and if the user decides to select a timer module, the control proceeds to the step S9. It should be noted here that the user may decide beforehand whether to select a timer module or enter the input contents without selecting a timer module.

Step S9

The user interface unit 28 sends an attribute information acquisition command to the command executing unit 29 via an internal bus, where the attribute information acquisition command instructs to acquire attribute information of timer modules. In this example, module IDs "02:11" and "01:11" are attached to the attribute information acquisition command to indicate the timer modules from which the attribute information should be acquired, where the module ID "02:

11" having been transferred in the step S4, and the module ID "01:11" having been transferred in the step S6.

Step S10

The command executing unit 29, having been received the attribute information acquisition command, issues attribute information acquisition requests to the modules identified by the module IDs attached to the attribute information acquisition command. In this example, the command executing unit 29 issues attribute information acquisition request "C_GET_TIMERID_REQ(02:11)" to the timer managing unit 25 identified by the module ID "02:11", and attribute information acquisition request "C_GET_TIMERID_REQ(01:11)" to the timer managing unit 15 identified by the module ID "01:11".

Step S11

The timer managing unit 25 of the PC 2, having received the attribute information acquisition request "C_GET_TIMEERID_REQ(02:11)", returns attribute information contained in the timer management table 201 to the command executing unit 29 as an attribute information acquisition response. In this example, attribute information acquisition response "C_GET_TIMERID_RSP (02:01 30:00:00:00, broadcasting station C, OFF/40:00:00:00, broadcasting station D, ON) (02:02 50:00:00:00, broadcasting station E, OFF) (04:01 NON, NON, OFF)" is returned to the command executing unit 29. The command executing unit 29 receives this response and sends it to the user interface unit 28.

Step 12

The timer managing unit 15 of the STB 1, having received the attribute information acquisition request "C_GET_TIMERID_REQ(01:11)" under control of the communication processing unit 11, returns attribute information contained in the timer management table 101 to the command executing unit 29 as an attribute information acquisition response. In this example, attribute information acquisition response "C_GET_TIMERID_RSP(01:01 10:00:00:00, broadcasting station A, OFF) (03:01 20:00:00:00, broadcasting station B, ON)" is returned to the command executing unit 29. The command executing unit 29 receives this response and sends it to the user interface unit 28.

Figure 7:
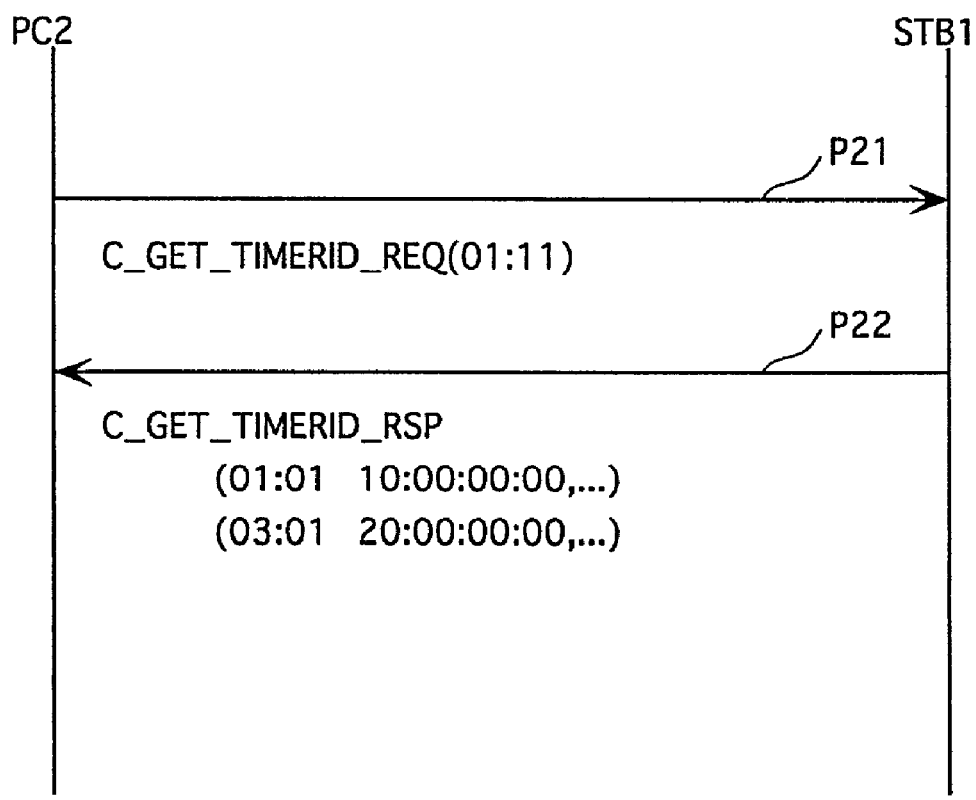
FIG. 7 shows transfer of an attribute information acquisition request and an attribute information acquisition response.

FIG. 7 shows transfer of an attribute information acquisition request and an attribute information acquisition response.

As shown in FIG. 7, the attribute information acquisition request "C_GET_TIMERID_REQ(01:11)" is transmitted from the PC 2 to the STB 1 (the arrow P21 in FIG. 7), and the attribute information acquisition response "C_GET_TIMERID_RSP(01:01 10:00:00:00, broadcasting station A, OFF) (03:01 20:00:00:00, broadcasting station B, ON)" is returned to the PC 2 (the arrow P22 in FIG. 7).

Step S13

The user interface unit 28 presents a screen for selecting timer module to the user, based on the attribute information acquisition responses transferred in the step S11 and step S12. Here, the screen for selecting timer module displays a list of pieces of attribute information corresponding to the timer modules so that the user selects a timer module among them.

Step S14

The user interface unit 28 receives designation of a standard timer module the user has selected referring to the listed pieces of attribute information. In this example, it is supposed that the user selects the time managing unit 30, which corresponds to a portion "(03:01 20:00:00:00, broadcasting station B, ON)" in the attribute information acquisition response transferred in the step S12, as the standard timer module.

Step S15

The presetting functioning unit 27 records into the timer presetting table the data input by the user for the recording presetting. If the user enters the input data for the recording presetting without selecting a timer module in step S8, the time managing unit 20 is automatically selected. In this example, the presetting functioning unit 27 records the timer ID of the time managing unit 30, start time, stop time, start command, and stop command into the timer presetting table. The presetting functioning unit 27 also records into the timer presetting table module ID "01:10" of the target apparatus controlling unit 13 that can read the current time from the time managing unit 30 selected by the user. FIG. 4 shows the timer presetting table generated in this procedure.

Figure 8:
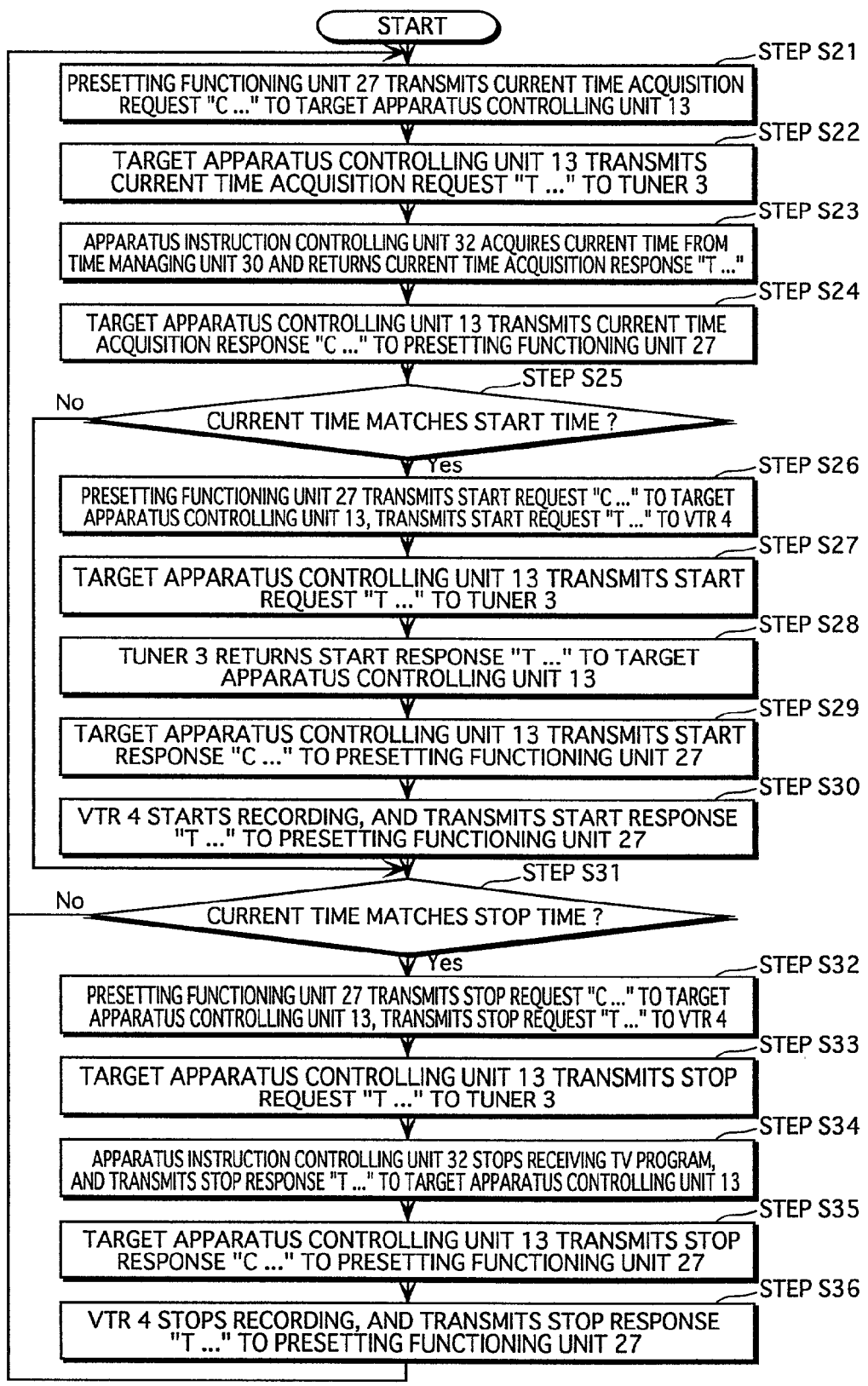
FIG. 8 shows a timer presetting procedure.

FIG. 8 shows a timer presetting procedure.

Now, an operation procedure of a recording presetting as an example of the timer presetting will be described with reference to FIG. 8.

It is supposed here that the timer presetting table 202 shown in FIG. 4 is stored in the timer presetting table storage unit 26.

Step S21

The presetting functioning unit 27 of the PC 2 refers to the timer presetting table and transmits current time acquisition request "C_GET_CURRENTTIME_REQ(01:10,03:01)" to the target apparatus controlling unit 13 having module ID "01:10" so that the current time is acquired from the time managing unit 30 having timer ID "03:01".

Note that the first character "C" in a request indicates that the request is transmitted to a controller.

Step S22

The target apparatus controlling unit 13 of the STB 1 receives the current time acquisition request "C . . . ", and transmits current time acquisition request "T_GET_CURRENTTIME_REQ(03,03:01)" to the tuner 3 that has the time managing unit 30 having the timer ID "03:01" specified in the current time acquisition request "C . . . ".

Note that the first character "T" in a request indicates that the request is transmitted to a target apparatus.

Step 23

The apparatus instruction controlling unit 32 of the tuner 3 receives the current time acquisition request "T . . . " under control of the communication processing unit 31, acquires the current time from the time managing unit 30 having the timer ID "03:01" specified in the current time acquisition request "T . . . ", and sends, under control of the communication processing unit 31, current time acquisition response "T_GET_CURRENTTIME_RSP(3/20 20:50:00)" to the target apparatus controlling unit 13 being the requester of the current time acquisition request "T . . . ".

Note that the first character "T" in a response indicates that the response is transmitted from a target apparatus.

Step 24

The target apparatus controlling unit 13 receives the current time acquisition response "T . . . " under control of the communication processing unit 11, and transmits current time acquisition response "C_GET_CURRENTTIME_RSP (3/20 20:50:00)" to the requester of the current time acquisition request "C . . . ", namely the presetting functioning unit 27 of the PC 2.

Note that the first character "C" in a response indicates that the response is transmitted from a controller.

Figure 9:
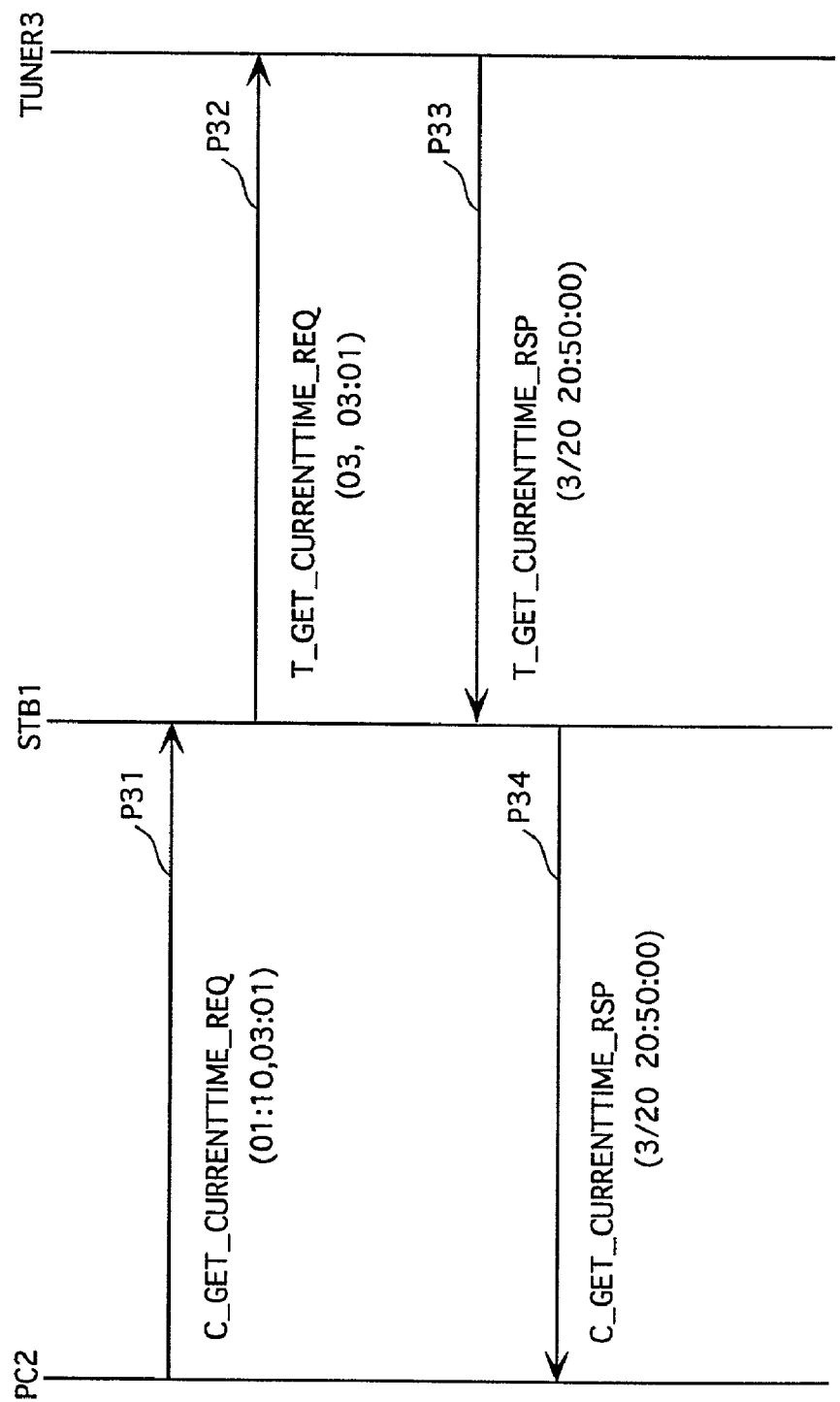
FIG. 9 shows transfer of a current time acquisition request "C . . . ", a current time acquisition request "T . . . ", a current time acquisition response "T . . . ", and a current time acquisition response "C . . . "

FIG. 9 shows transfer of a current time acquisition request "C . . . ", a current time acquisition request "T . . . ", a current time acquisition response "T . . . ", and a current time acquisition response "C . . . ".

As shown in FIG. 9, the presetting functioning unit 27 of the PC 2 transmits current time acquisition request "C_GET_ CURRENTTIME_REQ(01:10,03:01)" to the target apparatus controlling unit 13 of the STB 1 (the arrow P31 in FIG. 9), the target apparatus controlling unit 13 of the STB 1 transmits current time acquisition request "T_GET_ CURRENTTIME_REQ (03,03:01)" to the tuner 3 (the arrow P32 in FIG. 9), current time acquisition response "T_GET_CURRENTTIME_RSP(3/20 20:50:00)" is transmitted (the arrow P33 in FIG. 9), and current time acquisition response "C_GET_CURRENTTIME_RSP(3/20 20:50:00)" is transmitted (the arrow P34 in FIG. 9).

Step S25

The presetting functioning unit 27 receives the current time acquisition response "C . . . " under control of the communication processing unit 21, and judges whether the current time in the current time acquisition response "C . . . " matches the start time in the timer presetting table 202. If it is judged negatively in this step, the control jumps to step S31 to judge whether the current time matches the stop time; and if it is judged positively in this step, the control moves to step S26.

Step S26

The presetting functioning unit 27 transmits start request "C_Play_Req, 5CH(01:10)" to the target apparatus controlling unit 13 in accordance with "(01:10)::Play,5CH" written in the start command column of the timer presetting table 202, the target apparatus controlling unit 13 having the module ID "01:10" specified in "(01:10): Play, 5CH". The presetting functioning unit 27 also transmits start request "T_Rec_Req(04)" to the VTR 4 which is the target apparatus for the PC 2, in accordance with "(02:10)::Rec" written in the start command column of the timer presetting table 202, under control of the target apparatus controlling unit 23 having module ID "02:10" specified in "(02:10)::Rec".

Step S27

The target apparatus controlling unit 13 receives the start request "C_Play_Req,5CH(01:10)" under control of the communication processing unit 11, and transmits start request "T_Play_Req, 5CH(03)" to the tuner 3 which is the target apparatus for the STB 1.

Step S28

After the tuner 3 receives the start request "T_Play_Req, 5CH(03)" under control of the communication processing unit 31, the apparatus instruction controlling unit 32 starts receiving a TV program broadcast on a channel having the specified channel number "5CH", and transmits start response "T_Play_Rsp" to the target apparatus controlling unit 13 that is the requester of the start request "T . . . ".

Step S29

After receiving the start response "T_Play_Rsp" under control of the communication processing unit 11, the target apparatus controlling unit 13 transmits start response "C_Play_Rsp" to the presetting functioning unit 27 of the PC 2 that is the requester of the start request "C . . . ".

Step S30

After receiving start request "T_Rec_Req(04)", the VTR 4 starts recording, and transmits start response "T_Rec_Rsp" to the presetting functioning unit 27 which has transmitted the start request "T . . . ".

Figure 10:
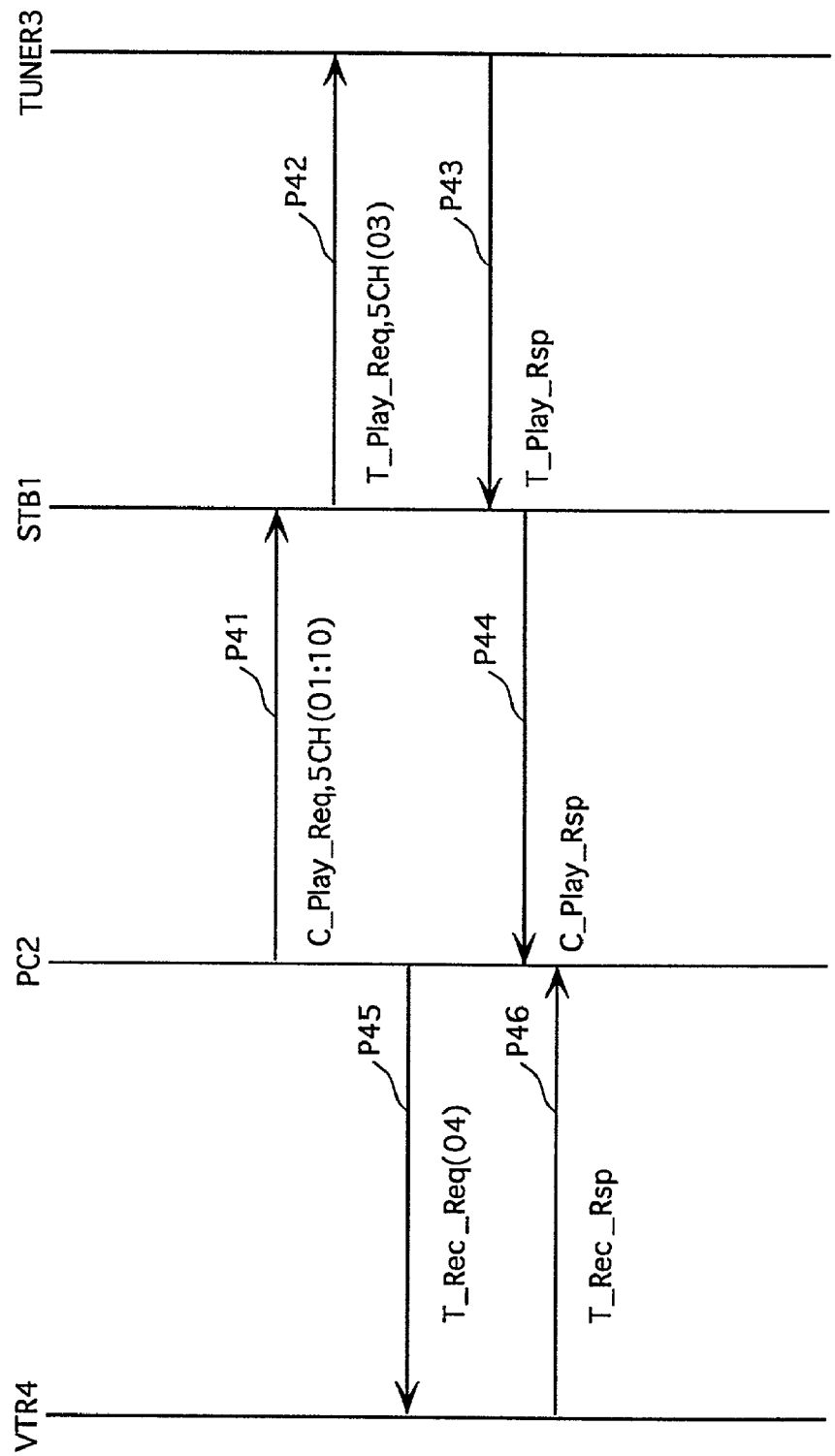
FIG. 10 shows transfer of a start request "C . . . " a start request "T . . . ", a start response "T . . . ", and a start response "C . . . "

FIG. 10 shows transfer of a start request "C . . . ", a start request "T . . . ", a start response "T . . . ", and a start response "C . . . ".

As shown in FIG. 10, the presetting functioning unit 27 of the PC 2 transmits start request "C_Play_Req, 5CH(03)" to the target apparatus controlling unit 13 of the STB 1 (the arrow P41 in FIG. 10), the target apparatus controlling unit 13 of the STB 1 transmits start request "T_Play_Req,5CH (03)" to the tuner 3 (the arrow P42 in FIG. 10), start response "T_Play_Rsp" is returned (the arrow P43 in FIG. 10) in response to the request, start response "C_Play_Rsp" is returned (the arrow P44 in FIG. 10) in response to the request, the presetting functioning unit 27 of the PC 2 transmits start request "T_Rec_Req(04)" to the VTR 4 (the arrow P45 in FIG. 10), and start response "T_Rec_Rsp" is returned (the arrow P46 in FIG. 10) in response to the request.

Step S31

The presetting functioning unit 27 judges whether the current time contained in the current time acquisition response "C . . . " matches the stop time in the timer presetting table 202. If it is judged negatively in the step S31, the control returns to the step S21 to judge whether the current time matches the stop time; and if it is judged positively in the step S31, the control moves to step S32.

Step S32

The presetting functioning unit 27 transmits stop request "C_Stop_R(01:10)" to the target apparatus controlling unit 13 in accordance with "(01:10)::Stop" written in the stop command column of the timer presetting table 202, the target apparatus controlling unit 13 having the module ID "01:10" specified in "(01:10)::Stop". The presetting functioning unit 27 also transmits stop request "T_Stop_R(04)" to the VTR 4 which is the target apparatus for the PC 2, in accordance with "(02:10)::Stop" written in the stop command column of the timer presetting table 202, under control of the target apparatus controlling unit 23 having module ID "02:10" specified in "(02:10)::Stop".

Step S33

The target apparatus controlling unit 13 receives the stop request "C_Stop_R (01:10)" under control of the communication processing unit 11, and transmits stop request "T_Stop_R(03)" to the tuner 3 which is the target apparatus for the STB 1.

Step S34

After the tuner 3 receives the stop request "T_Stop_Req (03)" under control of the communication processing unit 31, the apparatus instruction controlling unit 32 stops receiving the TV program, and transmits stop response "T_Stop Rsp" to the target apparatus controlling unit 13 that is the requester of the stop request "T . . . ".

Step S35

After receiving the stop response "T_Stop_Rsp" under control of the communication processing unit 11, the target apparatus controlling unit 13 transmits stop response "C_Stop_Rsp" to the presetting functioning unit 27 of the PC 2 that is the requester of the stop request "C . . . ".

Step 36

After receiving stop request "T_Stop_Req(04)", the VTR 4 stops recording, and transmits stop response "T_Stop_Rsp" to the presetting functioning unit 27 which has transmitted the stop request "T . . . ", and the control returns to the step S21.

Figure 11:
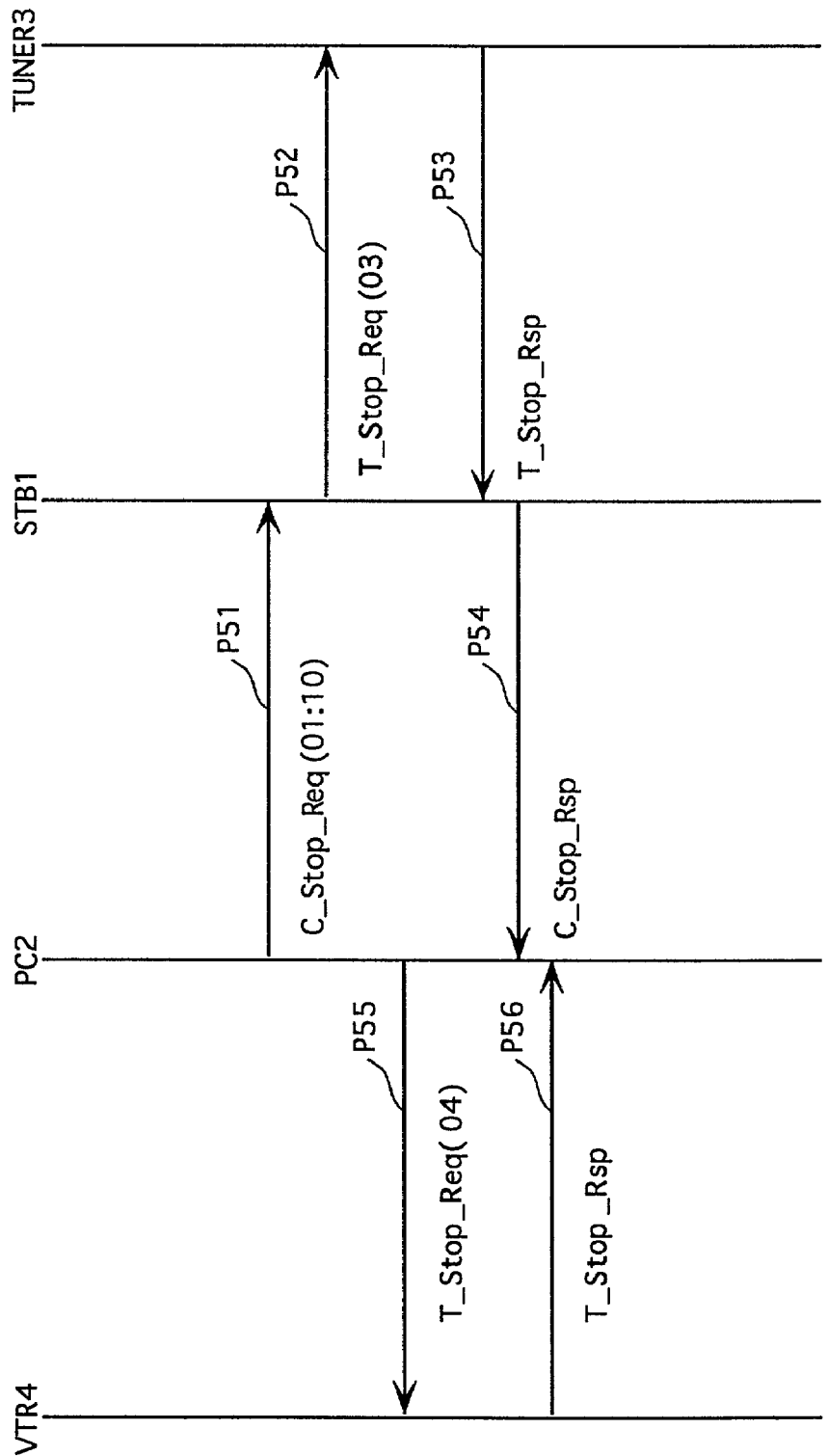
FIG. 11 shows transfer of a stop request "C . . . ", a stop request "T . . . ", a stop response "T . . . ", and a stop response "C . . . "

FIG. 11 shows transfer of a stop request "C . . . ", a stop request "T . . . ", a stop response "T . . . ", and a stop response "C . . . ".

As shown in FIG. 11, the presetting functioning unit 27 of the PC 2 transmits stop request "C_Stop_Req (01:10)" to the target apparatus controlling unit 13 of the STB 1 (the arrow P51 in FIG. 11), the target apparatus controlling unit 13 of the STB 1 transmits stop request "T_Stop_Req(03)" to the tuner 3 (the arrow P52 in FIG. 11), stop response "T_Stop_Rsp" is returned (the arrow P53 in FIG. 11) in response to the request, stop response "C Stop_Rsp" is returned (the arrow P54 in FIG. 11) in response to the request, the presetting functioning unit 27 transmits stop request "T_Stop_Req(04)" to the VTR 4 (the arrow P55 in FIG. 11), and stop response "T_Stop_Rsp" is returned (the arrow P56 in FIG. 11) in response to the request.

In the present embodiment, a start request or a stop request is output only when the current time acquired at regular intervals from a timer module written in the timer presetting table matches the start time or the stop time written in the timer presetting table. However, a start request or a stop request may be output when a trigger for the request is output.

Figure 12:
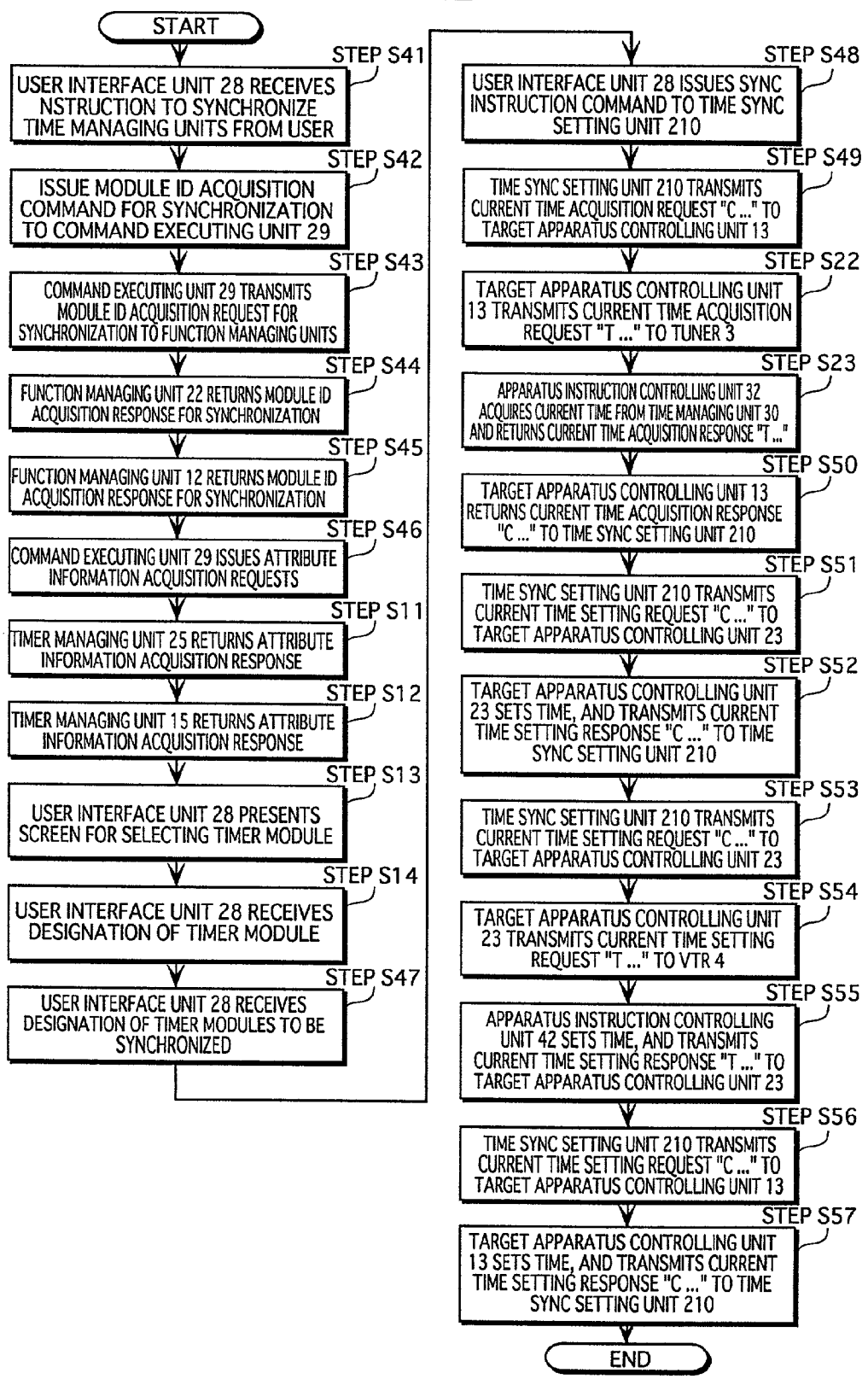
FIG. 12 shows an operation procedure in which the user selects some time managing units among a plurality of time managing units on the network and synchronizes the selected time managing units with each other.

FIG. 12 shows an operation procedure in which the user selects some time managing units among a plurality of time managing units on the network and synchronizes the selected time managing units with each other. Note that the steps having the same step numbers as those in FIG. 5 or FIG. 8 are the same as the steps with the same numbers.

Now, an operation procedure of a time synchronization will be described with reference to FIG. 12.

Step S41

The user interface unit 28 of the PC 2 receives from the user an instruction to synchronize time managing units on the network with each other.

Step S42

The user interface unit 28 issues a module ID acquisition command for synchronization to the command executing unit 29 via an internal bus, where the module ID acquisition command for synchronization instructs to acquire module IDs of (a) a module that manages attribute information of the timer modules that independently clock time and (b) a module that can read the current time of each of the timer modules and can write the current time to each of the timer modules.

Step S43

The command executing unit 29 transmits a module ID acquisition request for synchronization to the function managing units contained in all controllers existing on the network 5. In this example, the command executing unit 29 transmits module ID acquisition request for synchronization "S_C_GET_MODULEID_REQ(02:01)" to the function managing unit 22 of the PC 2, and transmits module ID acquisition request for synchronization "S_C_GET_MODULEID_REQ(01:01)" to the function managing unit 12 of the STB 1 under control of the communication processing unit 21.

Step S44

The function managing unit 22 of the PC 2, after receiving the module ID acquisition request for synchronization "S_C_GET_MODULEID_REQ(02:01)", returns module ID acquisition response for synchronization "S_C_GET_MODULEID_RSP (Timer Manage 02:11) (Target Control 02:10)" to the command executing unit 29, where in this example, the response "S_C_GET_MODULEID_RSP (Timer Manage 02:11) (Target Control 02:10)" contains module IDs of (a) the timer managing unit 25 that manages attribute information of the timer modules and (b) the target apparatus controlling unit 23 that can read/write the current time from/to each of the timer modules.

Step S45

The function managing unit 12 of the STB 1, after receiving the module ID acquisition request for synchronization "S C_GET_MODULEID_REQ(01:01)" under control of the communication processing unit 11, returns module ID acquisition response for synchronization "S_C_GET_MODULEID_RSP (Timer Manage 01:11) (Target Control 01:10)" to the command executing unit 29, where in this example, the response for synchronization "S_C_GET_MODULEID_RSP (Timer Manage 01:11) (Target Control 01:10)" contains module IDs of (a) the timer managing unit 15 that manages attribute information of the timer modules and (b) the target apparatus controlling unit 13 that can read/write the current time from/to each of the timer modules. The command executing unit 29 receives the response under control of the communication processing unit 21.

Figure 13:
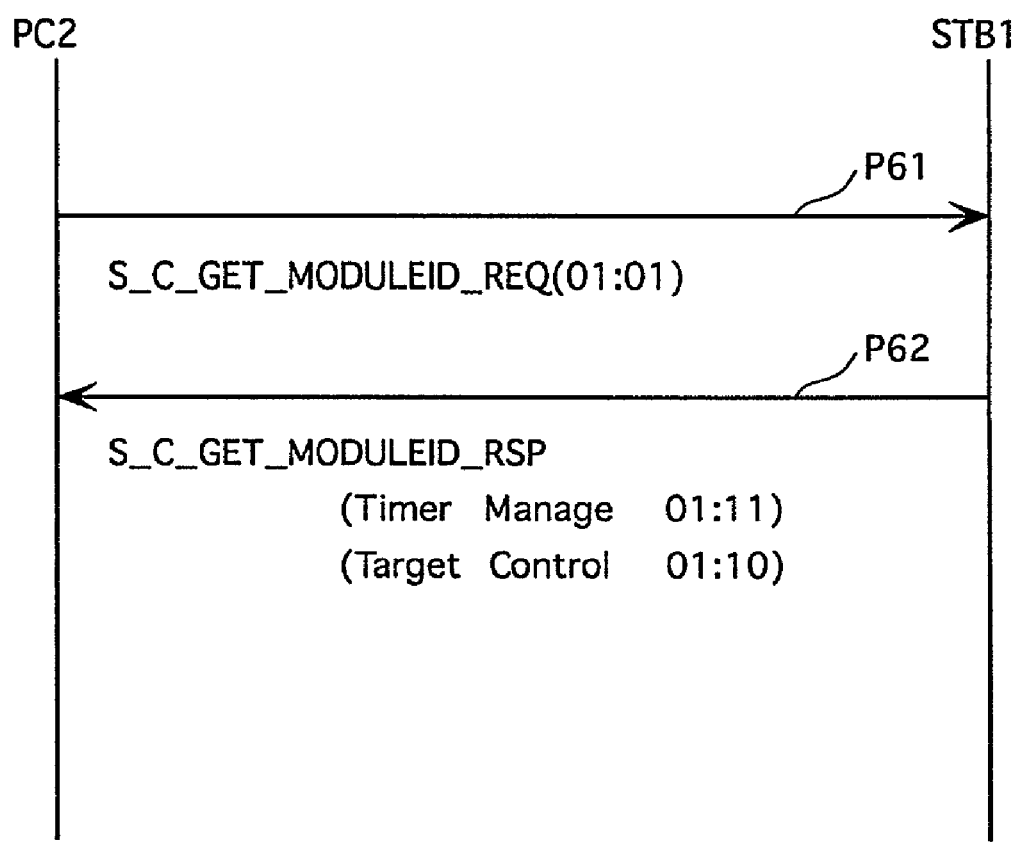
FIG. 13 shows transfer of a module ID acquisition request for synchronization and a module ID acquisition response for synchronization.

FIG. 13 shows transfer of a module ID acquisition request for synchronization and a module ID acquisition response for synchronization.

As shown in FIG. 13, the module ID acquisition request for synchronization "S_C_GET_MODULEID_REQ(01:01)" is transmitted from the PC 2 to the STB 1 (the arrow P61 in FIG. 13), and the module ID acquisition response for synchronization "S_C_GET_MODULEID_RSP (Timer Manage 01:11) (Target Control 01:10)" is returned to the PC 2 (the arrow P62 in FIG. 13).

Step S46

The command executing unit 29 issues attribute information acquisition requests to the modules having the module IDs that have been received in the steps S44 and S45, namely "02:11" and "01:11", respectively. In this example, the command executing unit 29 issues attribute information acquisition request "C_GET_TIMERID_REQ(02:11)" and attribute information acquisition request "C_GET_TIMERID_REQ(01:11)".

Step S11

The timer managing unit 25 of the PC 2, having received the attribute information acquisition request "C_GET_TIMERID_REQ(02:11)", returns attribute information contained in the timer management table 201 to the command executing unit 29 as an attribute information acquisition response. In this example, attribute information acquisition response "C_GET_TIMERID_RSP(02:01 30:00:00:00, broadcasting station C, OFF/40:00:00:00, broadcasting station D, ON) (02:02 50:00:00:00, broadcasting station E, OFF) (04:01 NON, NON, OFF)" is returned to the command executing unit 29. The command executing unit 29 receives this response and sends it to the user interface unit 28.

Step 12

The timer managing unit 15 of the STB 1, having received the attribute information acquisition request "C_GET_TIMERID_REQ(01:11)" under control of the communication processing unit 11, returns attribute information contained in the timer management table 101 to the command executing unit 29 as an attribute information acquisition response. In this example, attribute information acquisition response "C_GET_TIMEERID RSP(01:01 10:00:00:00, broadcasting station A, OFF) (03:01 20:00:00:00, broadcasting station B, ON)" is returned to the command executing unit 29. The command executing unit 29 receives this response and sends it to the user interface unit 28.

As shown in FIG. 7, the attribute information acquisition request "C_GET_TIMERID_REQ(01:11)" is transmitted from the PC 2 to the STB 1 (the arrow P21 in FIG. 7), and the attribute information acquisition response "C_GET_TIMERID_RSP(01:01 10:00:00:00, broadcasting station A, OFF) (03:01 20:00:00:00, broadcasting station B, ON)" is returned to the PC 2 (the arrow P22 in FIG. 7).

Step S13

The user interface unit 28 presents a screen for selecting timer module to the user, based on the attribute information acquisition responses transferred in the step S11 and step S12. Here, the screen for selecting timer module displays a list of pieces of attribute information corresponding to the timer modules so that the user selects a timer module among them.

Step S14

The user interface unit 28 receives designation of a standard timer module the user has selected referring to the listed pieces of attribute information. In this example, it is supposed that the user selects the time managing unit 30, which corresponds to a portion "(03:01 20:00:00:00, broadcasting station B, ON)" in the attribute information acquisition response transferred in the step S12, as the standard timer module.

Step S47

The user interface unit 28 receives, from the user, designation of timer modules to be synchronized with each other, which have been selected by the user referring to the listed pieces of attribute information. In this example, it is supposed that the user selects the time managing units 10, 20, and 40 as the timer modules to be synchronized with each other.

Step S48

The user interface unit 28 issues a sync instruction command to the time sync setting unit 210 via an internal bus, the sync instruction command instructing to synchronize the times managed by the time managing units with the time managed by the time managing unit 30. Here, the following IDs are attached to the sync instruction command: "03:01" which is a timer ID of a standard timer module selected in step S12; "01:01" which is a module ID of a module that can read the current time from the standard timer module, where themodule is requested to output the current time; "01:01", "02:01", "02:02", and "04:01" which are timer IDs of timer modules selected in step S13 to be synchronized with each other; and "01:10", "02:10", "02:10", and "02:10" which are module IDs of modules that can respectively write the current time to the timer modules.

Step S49

The time sync setting unit 210 receives the sync instruction command and transmits current time acquisition request "C_GET_CURRENTTIME_REQ(01:10,03:01)" to the target apparatus controlling unit 13 having module ID "01:10" so that the current time is acquired from the time managing unit 30 having timer ID "03:01".

Step S22

The target apparatus controlling unit 13 of the STB 1 receives the current time acquisition request "C . . . ", and transmits current time acquisition request "T_GET_CURRENTTIME_REQ(03,03:01)" to the tuner 3 that has the time managing unit 30 having the timer ID "03:01" specified in the current time acquisition request "C . . . ".

Step 23

The apparatus instruction controlling unit 32 of the tuner 3 receives the current time acquisition request "T . . . " under control of the communication processing unit 31, acquires the current time from the time managing unit 30 having the timer ID "03:01" specified in the current time acquisition request "T . . . ", and sends, under control of the communication processing unit 31, current time acquisition response "T_GET_CURRENTTIME_RSP(3/20 20:50:00)" to the target apparatus controlling unit 13 being the requester of the current time acquisition request "T . . . ".

Step 50

The target apparatus controlling unit 13 receives the current time acquisition response "T . . . " under control of the communication processing unit 11, and transmits current time acquisition response "C_GET_CURRENTTIME_RSP (3/20 20:50:00)" to the requester of the current time acquisition request "C . . . ", namely the time sync setting unit 210 of the PC 2.

As shown in FIG. 9, the presetting functioning unit 27 of the PC 2 transmits current time acquisition request "C_GET_ CURRENTTIME_REQ (01:10, 03:01)" to the target apparatus controlling unit 13 of the STB 1 (the arrow P31 in FIG. 9), the target apparatus controlling unit 13 of the STB 1 transmits current time acquisition request "T_GET_CURRENTTIME_REQ (03,03:01)" to the tuner 3 (the arrow P32 in FIG. 9), current time acquisition response "T_GET_CURRENTTIME_RSP(3/20 20:50:00)" is transmitted (the arrow P33 in FIG. 9), and current time acquisition response "C_GET_CURRENTTIME_RSP(3/20 20:50: 00)" is transmitted (the arrow P34 in FIG. 9).

Step S51

The time sync setting unit 210 receives the current time acquisition response "C . . . " under control of the communication processing unit 21, and transmits current time setting request "C-SET_TIME_REQ(02:10,02:01/02:02,3/ 21 20:50:00)" to the target apparatus controlling unit 23 having the specified module ID "02:10" so that the current time is transmitted to the time managing unit 20 that is indicated by the timer IDs "02:01" and "02:02" of the timer modules to be synchronized with each other.

Step S52

After receiving the current time setting request "C-SET_ TIME_REQ (02:10,02:01/02:02,3/21 20:50:00)", the target apparatus controlling unit 23 of the PC2 sets, in according to the received request, the time managed by the time managing unit 20 indicated by the timer IDs "02:01" and "02:02" specified in the current time setting request, and transmits current time setting response "C_SET_TIME_RSP" to the time sync setting unit 210 that has transmitted the current time setting request.

Step S53

The time sync setting unit 210 of the PC 2 transmits current time setting request "C_SET_TIME_REQ (02:10, 04:01,3/21 20:50:00)" to the target apparatus controlling unit 23 having the specified module ID "02:10" so as to transmit the current time to the time managing unit 40 indicated by the timer ID "04:01", which is attached to the sync instruction command, of the timer module to be synchronized.

Step 54

The target apparatus controlling unit 23 of the PC 2 receives the current time setting request "C_SET_TIME_REQ (02:10,04:01,3/21 20:50:00)", and transmits current time setting request "T_SET TIME_REQ (04,04:01,3/21 20:50:00)" to the VTR 4.

Step 55

The apparatus instruction controlling unit 42 of the VTR 4 receives the current time setting request "T_SET_TIME_REQ (04,04:01,3/21 20:50:00)" under control of the communication processing unit 41, sets the time managed by the time managing unit 40 having the timer ID "04:01" indicated by the received current time setting request "T . . . " in accordance with the received current time setting request "T . . . ", and transmits current time setting response "T_SET_TIME_RSP" to the target apparatus controlling unit 23 that has transmitted the current time setting request "T . . . ".

Step 56

The time sync setting unit 210 of the PC 2 transmits current time setting request "C_SET_TIME_REQ(01:10,01:01,3/21 20:50:00)" to the target apparatus controlling unit 13 of the STB 13 having the specified module ID "01:10" so as to transmit the current time to the time managing unit 10 indicated by the timer ID "01:01", which is attached to the sync instruction command, of the timer module to be synchronized.

Step S57

After receiving the current time setting request "C-SET_TIME_REQ(01:10,01:01,3/21 20:50:00)" under control of the communication processing unit 11, the target apparatus controlling unit 13 of the STB 1 sets, in according to the received request, the time managed by the time managing unit 10 indicated by the timer ID "01:01" specified in the received request, and transmits current time setting response "C-SET_TIME_RSP" to the time sync setting unit 210 that has transmitted the current time setting request "C . . . ".

Figure 14:
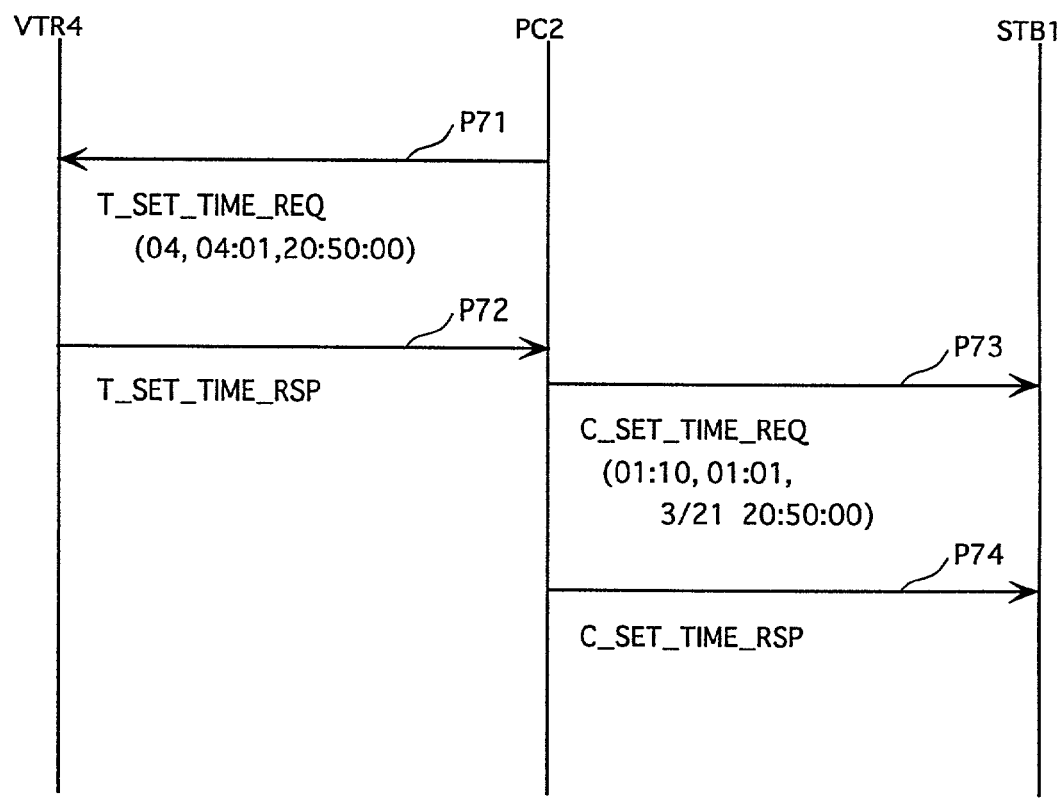
FIG. 14 shows transfer of a current time setting request "T . . . ", a current time setting response "T . . . ", a current time setting request "C . . . ", and a current time setting response "C . . . "

FIG. 14 shows transfer of a current time setting request "T . . . ", a current time setting response "T . . . ", a current time setting request "C . . . ", and a current time setting response "C . . . ".

As shown in FIG. 14, the current time setting request "T_SET_TIME_REQ(04, 04:01,3/21 20:50:00)" is transmitted from the target apparatus controlling unit 23 of the PC 2 to the VTR 4 (the arrow P71 in FIG. 14), the current time setting response "T_SET_TIME_RSP" is returned from the apparatus instruction controlling unit 42 of the VTR 4 to the target apparatus controlling unit 23 (the arrow P72 in FIG. 14), the current time setting request "C_SET_TIME_REQ(01:10,01:01,3/21 20:50:00)" is transmitted from the time sync setting unit 210 of the PC 2 to the target apparatus controlling unit 13 of the STB 1 (the arrow P73 in FIG. 14), and the current time setting response "C SET_TIME_RSP" is returned from the target apparatus controlling unit 13 to the time sync setting unit 210 (the arrow P74 in FIG. 14).

As described above, a plurality of time managing units on the network are synchronized with each other.

Embodiment 2

Summary

A controller continuously receives a plurality of standard times from the modules that manages the standard times, and vicariously manages the standard times by assigning marks to them.

The controller selects, for each preset event, a module that manages a standard time, and informs previously the target apparatuses of the mark, the event start time, the event stop time, the event name or the like.

The target apparatuses continuously acquires the standard time for the preset event that is vicariously managed by the controller, judges whether the acquired time matches the event start time or the stop time, starts the preset event when the acquired time matches the start time, and stops the preset event when the acquired time matches the stop time.

Construction

Figure 15:
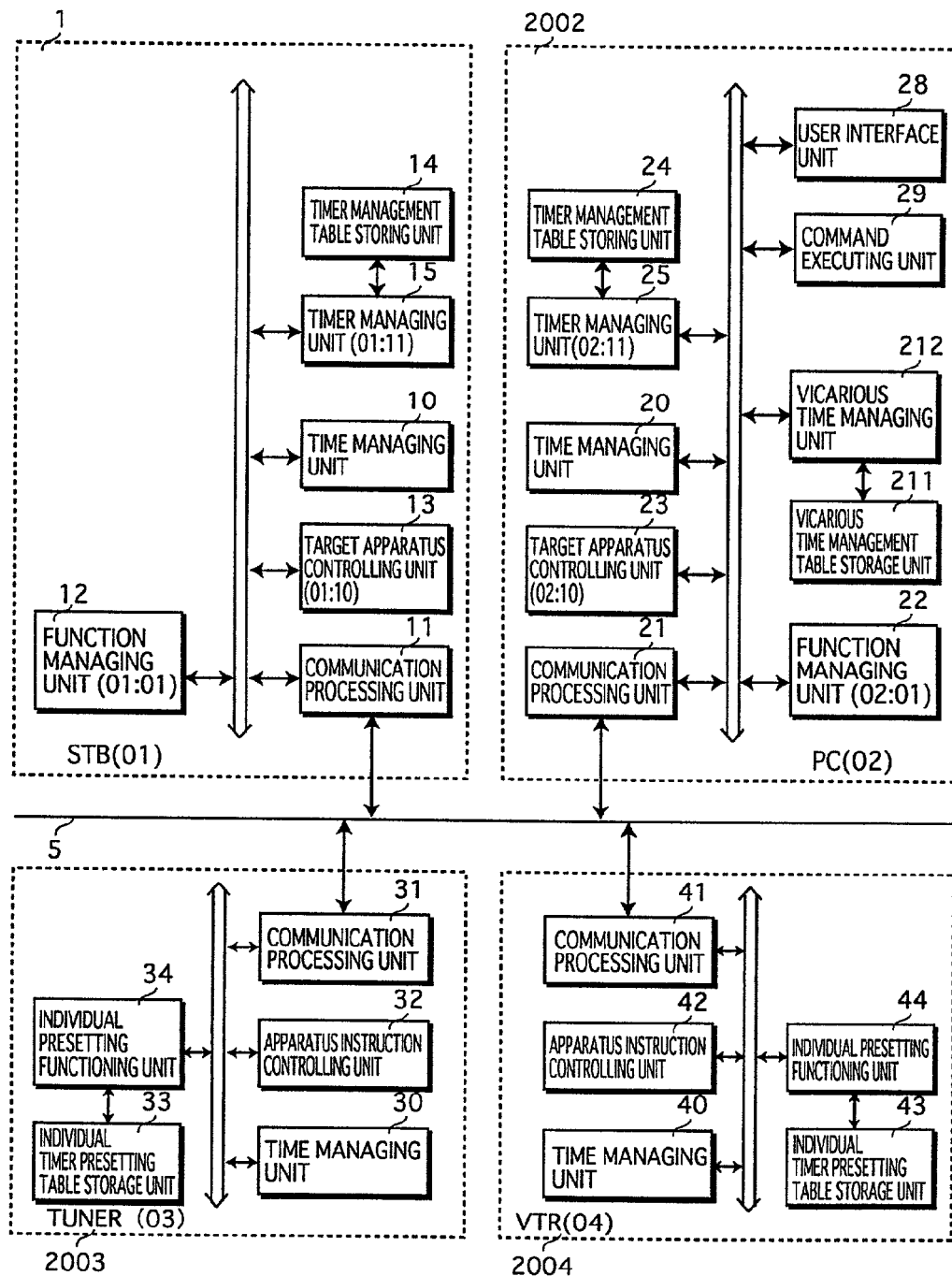
FIG. 15 shows the construction of a network to which a plurality of apparatuses relating to Embodiment 2 of the present invention are connected.

FIG. 15 shows the construction of a network to which a plurality of apparatuses relating to Embodiment 2 of the present invention are connected.

In FIG. 15, the STB 1 and the PC 2002 are controllers, the tuner 2003 and the VTR 2004 are target apparatuses. These apparatuses constitute the network 5 and can communicate with each other via the network 5.

Note that the same elements as those in Embodiment 1 have the same reference numbers, without further explanation here.

The PC 2002 is a personal computer that controls the VTR 2004, and includes a time managing unit 20, a communication processing unit 21, a function managing unit 22, a target apparatus controlling unit 23, a timer management table storing unit 24, a timer managing unit 25, a vicarious time management table storage unit 211, a vicarious time managing unit 212, a user interface unit 28, and a command executing unit 29.

The tuner 2003 is a receiving apparatus that receives broadcast data broadcast on a communication network different from the network 5, and includes a time managing unit 30, a communication processing unit 31, an apparatus instruction controlling unit 32, an individual timer presetting table storage unit 33, and an individual presetting functioning unit 34. It is supposed here that the tuner 2003 receives TV programs that are broadcast by means of the terrestrial broadcasting or the satellite broadcasting.

The VTR 2004 is a recording apparatus that records audio data and video data onto video tape, and includes a time managing unit 40, a communication processing unit 41, an apparatus instruction controlling unit 42, an individual timer presetting table storage unit 43, and an individual presetting functioning unit 44.

Each of the STB 1, the PC 2002, the tuner 2003, and the VTR 2004 is assigned with a different ID, stores the ID of itself and IDs of the other apparatuses beforehand. It is supposed here that the STB 1 has apparatus ID "01", the PC 2002 "02", the tuner 2003 "03", and the VTR 2004 "04".

Among the modules of the STB 1, modules that communicate with the PC 2002 are assigned with different module IDs.

Among the modules of the PC 2002, modules that communicate with the STB 1 are assigned with different module IDs. It is supposed here that the vicarious time managing unit 212 has module ID "02:12", and that the other modules have the same module IDs as in Embodiment 1.

The vicarious time management table storage unit 211 stores a vicarious time management table. The vicarious time management table contains time source information and marks corresponding to the sources. The time source information indicates the sources of the times that are to be referred to during the presetting process. For example, the time source information includes a URL of an internet broadcasting station, a URL of a time managing server, a channel number of a radio broadcasting station, or a timer ID of a timer module. The vicarious time management table may be set before shipment of the PC 2002. Alternatively, the vicarious time management table may be set by the user before the presetting process is started and may be updated based on the operation of the user.

FIG. 16 shows a vicarious time management table stored in the vicarious time management table storage unit 211.

In the vicarious time management table shown in FIG. 16, the source information corresponding to the mark "A" is a URL of internet broadcasting station A, the source information corresponding to the mark "B" is a URL of time managing server B, the source information corresponding to the mark "C" is a channel number of a radio broadcasting station C, and the source information corresponding to the mark "D" is a timer ID of the time managing unit 20 that is a timer module contained in the PC 20.

The vicarious time managing unit 212 manages the vicarious time management table. More particularly, the vicarious time managing unit 212 acquires current times from the sources indicated by the source information shown in the vicarious time management table, and manages the times in place of the sources by correlating the times with marks. On receiving a presetting instruction together with necessary information from the user, the vicarious time managing unit 212 prepares presetting information based on the received information and transmits the presetting information to target apparatuses that execute the specified events, where the presetting information contains an event start time, an event stop time, a start event name being a name of an event that should be executed at the start time, a stop event name being a name of an event that should be stopped at the stop time, a module ID of the vicarious time managing unit 212, and a mark corresponding to a standard time. Upon receiving a time transmission request with a mark from a target apparatus, the vicarious time managing unit 212 returns a time corresponding to the received mark to the sender of the request. It should be noted here that the Network Time Protocol (TCP/IP) may be used to acquire a time.

The individual timer presetting table storage units 33 and 43 store individual timer presetting tables. Here, an individual timer presetting table contains a module ID of a vicarious time managing unit that vicariously manages a time that is to be referred to during a presetting process, a mark corresponding to the vicarious time managing unit, an event start time, an event stop time, a start event name, and a stop event name.

FIG. 17A shows an individual timer presetting table stored in the individual timer presetting table storage unit 33.

FIG. 17B shows an individual timer presetting table stored in the individual timer presetting table storage unit 43.

The individual timer presetting table 203 shown in FIG. 17A has the following contents. The "mark" column shows a mark corresponding to a time that is vicariously managed, and in this example, the mark "B" indicates that the vicariously managed time is provided by the time managing server B. The "module ID" column shows a module ID of a module that vicariously manages the specified time, and in this example, the time is vicariously managed by the vicarious time managing unit 212 having the module ID "02:12". The "start time" and "stop time" columns show a start time and a stop time of an event, respectively. The "start event" column shows an event to be executed at the start time, and the "stop event" column shows an event to be executed at the stop time. In this example, the start event "Play,5CH" indicates that a program should be received from the channel "5CH", and the stop event "Stop" indicates that the receiving of the program should be stopped.

The individual timer presetting table 204 shown in FIG. 17B has the following contents. The "mark" column shows a mark corresponding to a time that is vicariously managed, and in this example, the mark "B" indicates that the vicariously managed time is provided by the time managing server B. The "module ID" column shows a module ID of a module that vicariously manages the specified time, and in this example, the time is vicariously managed by the vicarious time managing unit 212 having the module ID "02:12". The "start time" and "stop time" columns show a start time and a stop time of an event, respectively. The "start event" column shows an event to be executed at the start time, and the "stop event" column shows an event to be executed at the stop time. In this example, the start event "Rec" indicates that a recording should be executed, and the stop event "Stop" indicates that the recording should be stopped.

Each of the individual presetting functioning units 34 and 44 manages the individual timer presetting table and executes the preset operations. More particularly, the individual presetting functioning unit records the presetting information received from the vicarious time managing unit 212 into the individual timer presetting table, transmits a mark to a corresponding vicarious time managing unit having a module ID shown in the individual timer presetting table to acquire the current time from the vicarious time managing unit, starts an event specified in the table when the acquired time matches the specified start time, and stops the event when the acquired time matches the specified stop time.

Operation

Figure 18:
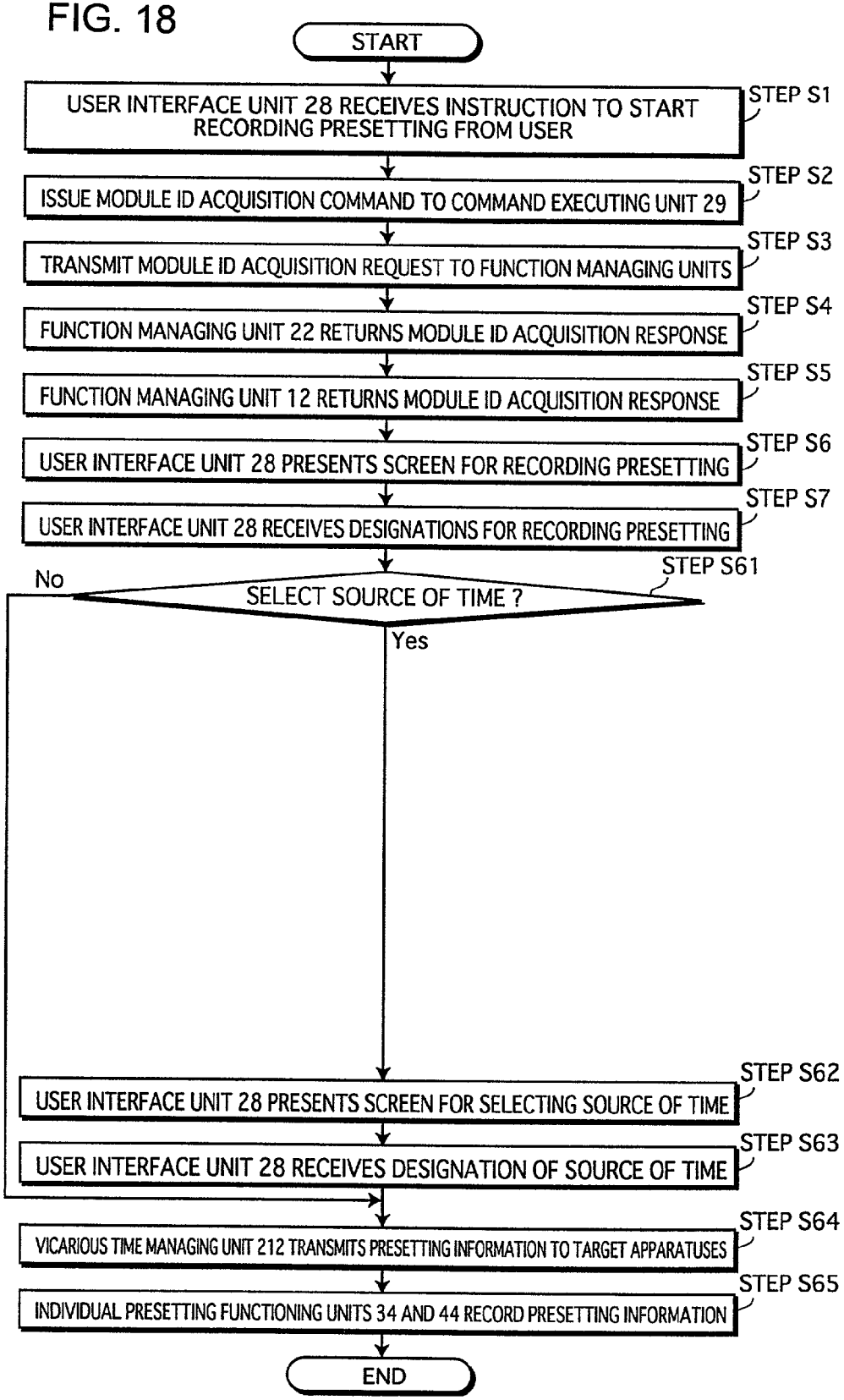
FIG. 18 shows a timer presetting procedure performed by the user using the PC 2002.

FIG. 18 shows a timer presetting procedure performed by the user using the PC 2002.

Now, an operation procedure of a recording presetting as an example of the timer presetting will be described with reference to FIG. 18.

Note that the same steps as those in FIG. 5 in Embodiment 1 are assigned with the same step numbers and will not be detailed here.

Steps S1 to S7

Same as those in FIG. 5 in Embodiment 1.

Step S61

The user interface unit 28 urges the user to decide whether the user would like to select a source of the time the user will refer to during the presetting process or to enter the input contents without selecting a source of the time. Here, if the user decides to enter the input contents without selecting a source of the time, the control jumps to the step S64; and if the user decides to select a source of the time, the control proceeds to the step 62. It should be noted here that the user may decide beforehand whether to select a source of the time or enter the input contents without selecting a source of the time.

Step S62

The user interface unit 28 presents a screen for selecting a source of time to the user, presenting the sources of times contained in the time source information stored in the vicarious time management table storage unit 211.

Step S63

The user interface unit 28 receives designation of a source of time. In this example, it is supposed that the user selects a source corresponding to the mark "B" shown in the vicarious time management table shown in FIG. 16.

Step S64

The vicarious time managing unit 212 prepares presetting information based on the received information and transmits the presetting information to target apparatuses that execute the specified events, where the presetting information contains an event start time, an event stop time, a start event name being a name of an event that should be executed at the start time, a stop event name being a name of an event that should be stopped at the stop time, a module ID of the vicarious time managing unit 212, and a mark corresponding to a standard time. If the user enters the input data for the recording presetting without selecting a source of time in step S61, the time managing unit 20 is automatically selected.

Step S65

The individual presetting functioning units 34 and 44 record the presetting information received from the vicarious time managing unit 212 into the individual timer presetting tables.

Figure 19:
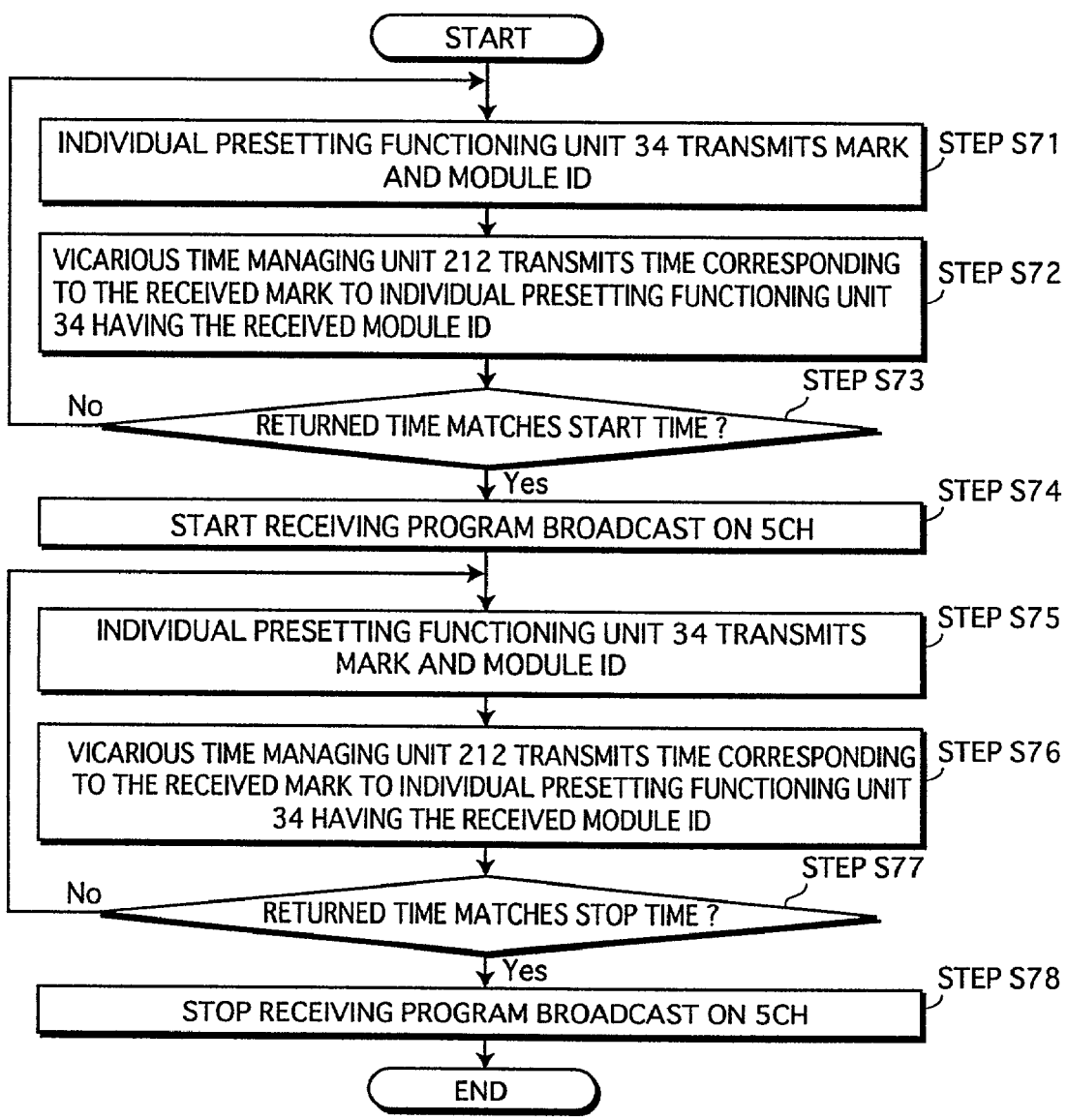
FIG. 19 shows a timer presetting procedure of the tuner 2003.

FIG. 19 shows a timer presetting procedure of the tuner 2003.

Now, an operation procedure of the tuner 2003 will be described with reference to FIG. 19, using a recording presetting as an example of the timer presetting.

It is supposed here that the individual timer presetting table storage unit 33 stores the individual timer presetting table 203 shown in FIG. 17A.

Step S71

The individual presetting functioning unit 34 transmits the mark "B" and the module ID "03:02" of the individual presetting functioning unit 34 itself, as a pair, to the vicarious time managing unit 212 having the module ID "02:12" specified in the individual timer presetting table 203 to obtain the current time from the vicarious time managing unit 212.

Step S72

The vicarious time managing unit 212 receives the mark "B" and the module ID "03:02", and transmits avicariously managed time corresponding to the mark "B" to the individual presetting functioning unit 34 having the received module ID "03:02".

Step S73

The individual presetting functioning unit 34 judges whether the time returned from the vicarious time managing unit 212 matches the event start time "21:00" written in the individual timer presetting table 203. If it is judged negatively in step S73, the control returns to the step S71; and if it is judged positively in step S73, the control proceeds to the step S74.

Step S74

The individual presetting functioning unit 34 starts receiving a program broadcast on the channel "5CH" based on the start event name "Play,5CH" written in the individual timer presetting table 203.

Step S75

The individual presetting functioning unit 34 transmits the mark "B" and the module ID "03:02" of the individual presetting functioning unit 34 itself, as a pair, to the vicarious time managing unit 212 having the module ID "02:12" specified in the individual timer presetting table 203 to obtain the current time from the vicarious time managing unit 212.

Step S76

The vicarious time managing unit 212 receives the mark "B" and the module ID "03:02", and transmits avicariously managed time corresponding to the mark "B" to the individual presetting functioning unit 34 having the received module ID "03:02".

Step S77

The individual presetting functioning unit 34 judges whether the time returned from the vicarious time managing unit 212 matches the event stop time "23:00" written in the individual timer presetting table 203. If it is judged negatively in step S77, the control returns to the step S75; and if it is judged positively in step S77, the control proceeds to the step S78.

Step S78

The individual presetting functioning unit 34 stops receiving the program broadcast on the channel "5CH" based on the stop event name "Stop" written in the individual timer presetting table 203.

Figure 20:
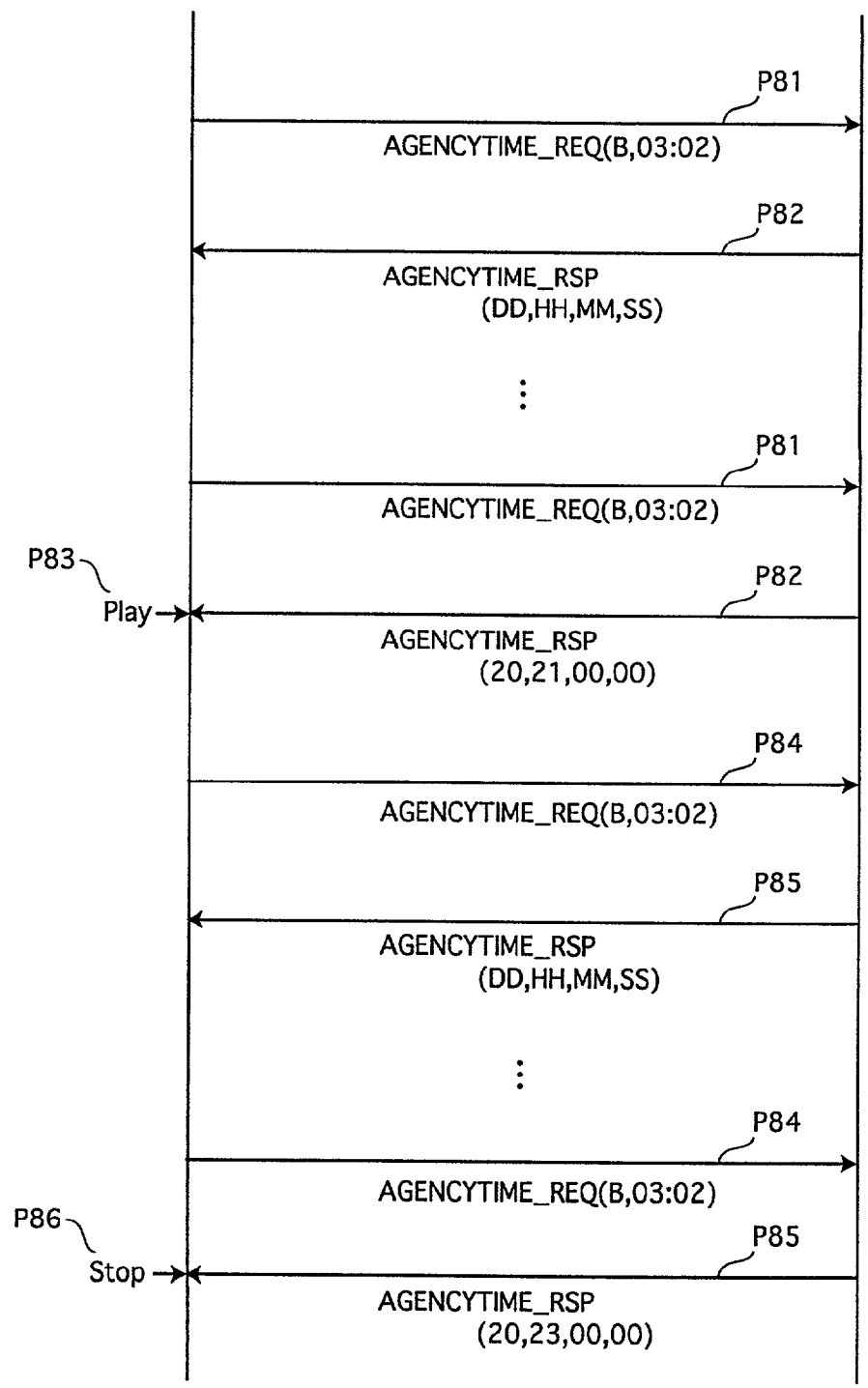
FIG. 20 shows transfer of a vicarious time request and a vicarious time response.

FIG. 20 shows transfer of a vicarious time request and a vicarious time response.

As shown in FIG. 20, the vicarious time request "AGENCYTIME_REQ(B,03:02)" is transmitted from the individual presetting functioning unit 34 to the vicarious time managing unit 212 (the arrow P81 in FIG. 20), the vicarious time response "AGENCYTIME_RSP(DD,HH,MM,SS)" is returned from the vicarious time managing unit 212 to the individual presetting functioning unit 34 (the arrow P82 in FIG. 20), the transfer of the request and the return of the response are repeated until the returned vicarious time matches the start time "21:00". Here, when the returned vicarious time matches the start time "21:00", the individual presetting functioning unit 34 starts receiving a program broadcast on the channel "5CH" (the arrow P83 in FIG. 20). Then, the vicarious time request "AGENCYTIME_REQ (B,03:02)" is transmitted from the individual presetting functioning unit 34 to the vicarious time managing unit 212 (the arrow P84 in FIG. 20), the vicarious time response "AGENCYTIME_RSP(DD,HH,MM,SS)" is returned from the vicarious time managing unit 212 to the individual presetting functioning unit 34 (the arrow P85 in FIG. 20), the transfer of the request and the return of the response are repeated until the returned vicarious time matches the stop time "23:00". Here, when the returned vicarious time matches the stop time "23:00", the individual presetting functioning unit 34 stops receiving the program broadcast on the channel "5CH" (the arrow P86 in FIG. 20).

Figure 21:
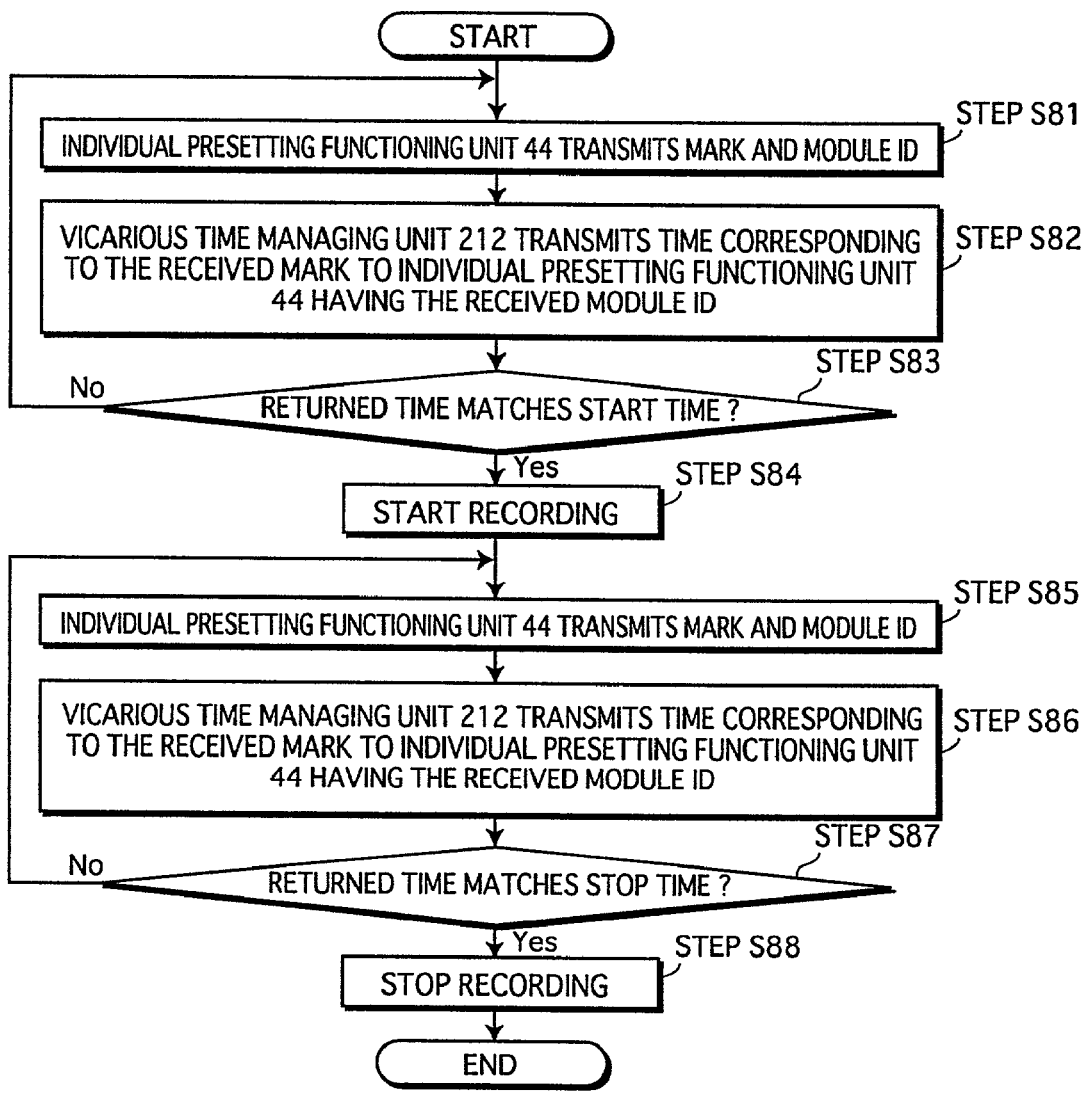
FIG. 21 shows a timer presetting procedure of the VTR 2004.

FIG. 21 shows a timer presetting procedure of the VTR 2004.

Now, an operation procedure of the VTR 2004 will be described with reference to FIG. 21, using a recording presetting as an example of the timer presetting.

It is supposed here that the individual timer presetting table storage unit 43 stores the individual timer presetting table 204 shown in FIG. 17B.

Step S81

The individual presetting functioning unit 44 transmits the mark "B" and the module ID "04:02" of the individual presetting functioning unit 44 itself, as a pair, to the vicarious time managing unit 212 having the module ID "02:12" specified in the individual timer presetting table 204 to obtain the current time from the vicarious time managing unit 212.

Step S82

The vicarious time managing unit 212 receives the mark "B" and the module ID "04:02", and transmits a vicariously managed time corresponding to the mark "B" to the individual presetting functioning unit 44 having the received module ID "04:02".

Step S83

The individual presetting functioning unit 44 judges whether the time returned from the vicarious time managing unit 212 matches the event start time "21:00" written in the individual timer presetting table 204. If it is judged negatively in step S83, the control returns to the step S81; and if it is judged positively in step S83, the control proceeds to the step S84.

Step S84

The individual presetting functioning unit 44 starts recording based on the start event name "REC" written in the individual timer presetting table 204.

Step S85

The individual presetting functioning unit 44 transmits the mark "B" and the module ID "04:02" of the individual presetting functioning unit 44 itself, as a pair, to the vicarious time managing unit 212 having the module ID "02:12" specified in the individual timer presetting table 204 to obtain the current time from the vicarious time managing unit 212.

Step S86

The vicarious time managing unit 212 receives the mark "B" and the module ID "04:02", and transmits a vicariously managed time corresponding to the mark "B" to the individual presetting functioning unit 44 having the received module ID "04:02".

Step S87

The individual presetting functioning unit 44 judges whether the time returned from the vicarious time managing unit 212 matches the event stop time "23:00" written in the individual timer presetting table 204. If it is judged negatively in step S87, the control returns to the step S85; and if it is judged positively in step S87, the control proceeds to the step S88.

Step S88

The individual presetting functioning unit 44 stops recording based on the stop event name "Stop" written in the individual timer presetting table 204.

Figure 22:
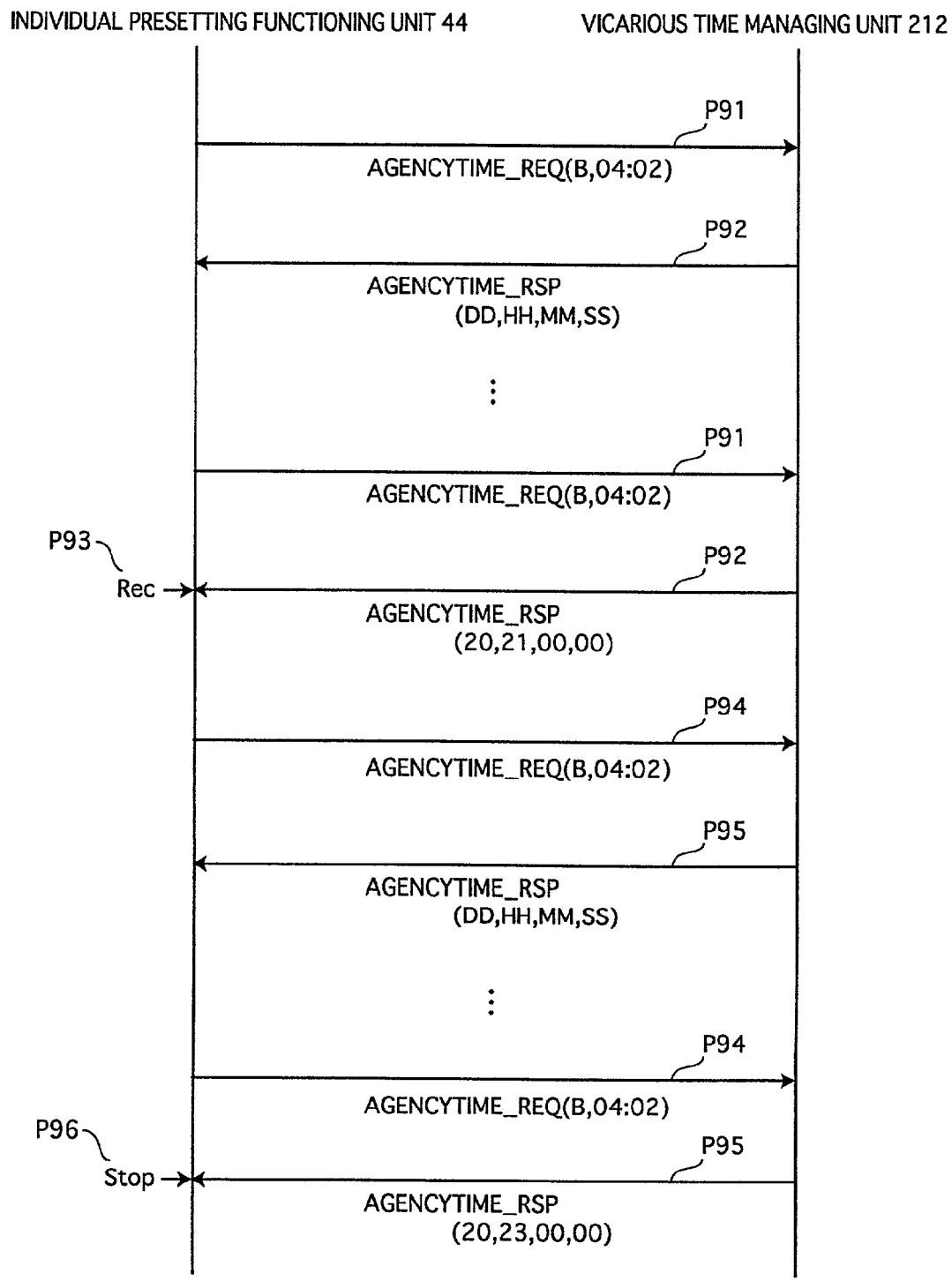
FIG. 22 shows transfer of a vicarious time request and a vicarious time response.

FIG. 22 shows transfer of a vicarious time request and a vicarious time response.

As shown in FIG. 22, the vicarious time request "AGENCYTIME_REQ(B,04:02)" is transmitted from the individual presetting functioning unit 44 to the vicarious time managing unit 212 (the arrow P91 in FIG. 22), the vicarious time response "AGENCYTIME_RSP(DD,HH,MM,SS)" is returned from the vicarious time managing unit 212 to the individual presetting functioning unit 44 (the arrow P92 in FIG. 22), the transfer of the request and the return of the response are repeated until the returned vicarious time matches the start time "21:00". Here, when the returned vicarious time matches the start time "21:00", the individual presetting functioning unit 44 starts recording (the arrow P93 in FIG. 22). Then, the vicarious time request "AGENCYTIME_REQ (B,04:02)" is transmitted from the individual presetting functioning unit 44 to the vicarious time managing unit 212 (the arrow P94 in FIG. 22), the vicarious time response "AGENCYTIME_RSP(DD,HH,MM,SS)" is returned from the vicarious time managing unit 212 to the individual presetting functioning unit 44 (the arrow P95 in FIG. 22), the transfer of the request and the return of the response are repeated until the returned vicarious time matches the stop time "23:00". Here, when the returned vicarious time matches the stop time "23:00", the individual presetting functioning unit 44 stops recording (the arrow P96 in FIG. 22).

As described above, apparatuses on the network can synchronize with each other in terms of the operation even if the times managed by the time managing units on the network do not synchronize.

Embodiment 3

Summary

A controller selects, for each preset event, a module that manages a standard time, reads the standard time managed by the module, and informs previously target apparatuses of the standard time, the event start time, the event stop time, the event name or the like. The target apparatuses manage the standard time for each event, judges whether the standard time matches the event start time, and starts the preset event when the standard time matches the start time.

Construction

Figure 23:
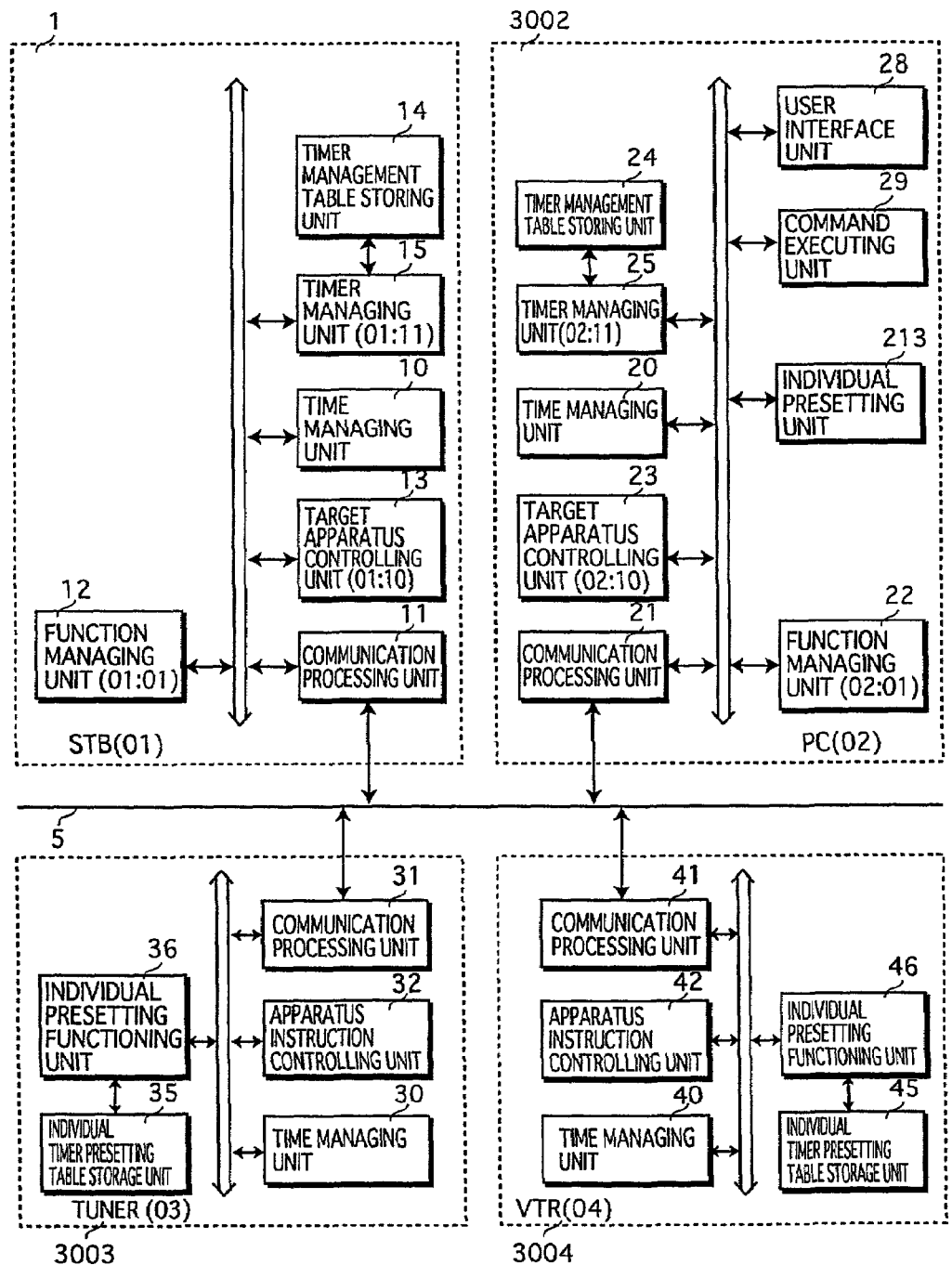
FIG. 23 shows the construction of a network to which a plurality of apparatuses relating to Embodiment 3 of the present invention are connected.

FIG. 23 shows the construction of a network to which a plurality of apparatuses relating to Embodiment 3 of the present invention are connected.

In FIG. 23, the STB 1 and the PC 3002 are controllers, the tuner 3003 and the VTR 3004 are target apparatuses. These apparatuses constitute the network 5 and can communicate with each other via the network 5.

Note that the same elements as those in Embodiment 1 have the same reference numbers, without further explanation here.

The PC 3002 is a personal computer that controls the VTR 3004, and includes a time managing unit 20, a communication processing unit 21, a function managing unit 22, a target apparatus controlling unit 23, a timer management table storing unit 24, a timer managing unit 25, an individual presetting unit 213, a user interface unit 28, and a command executing unit 29.

The tuner 3003 is a receiving apparatus that receives broadcast data broadcast on a communication network different from the network 5, and includes a time managing unit 30, a communication processing unit 31, an apparatus instruction controlling unit 32, an individual timer presetting table storage unit 35, and an individual presetting functioning unit 36. It is supposed here that the tuner 3003 receives TV programs that are broadcast by means of the terrestrial broadcasting or the satellite broadcasting.

The VTR 3004 is a recording apparatus that records audio data and video data onto video tape, and includes a time managing unit 40, a communication processing unit 41, an apparatus instruction controlling unit 42, an individual timer presetting table storage unit 45, and an individual presetting functioning unit 46.

Each of the STB 1, the PC 3002, the tuner 3003, and the VTR 3004 is assigned with a different ID, stores the ID of itself and IDs of the other apparatuses beforehand. It is supposed here that the STB 1 has apparatus ID "01", the PC 3002 "02", the tuner 3003 "03", and the VTR 3004 "04".

Among the modules of the STB 1, modules that communicate with the PC 3002 are assigned with different module IDs.

Among the modules of the PC 3002, modules that communicate with the STB 1 are assigned with different module IDs. It is supposed here that the modules in Embodiment 3 have the same module IDs as those in Embodiment 1.

The individual presetting unit 213 acquires a standard current time from a time managing unit and prepares presetting information based on a presetting instruction and necessary information input by the user, and transmits the presetting information to target apparatuses that execute the specified events, where the presetting information contains the standard current time, an event start time, an event stop time, a start event name being a name of an event that should be executed at the start time, a stop event name being a name of an event that should be stopped at the stop time.

The individual timer presetting table storage units 35 and 45 store individual timer presetting tables. Here, an individual timer presetting table contains a time difference that is a difference between a standard time and a time managed by a time managing unit in the apparatus itself, an event start time, an event stop time, a start event name, and a stop event name.

FIG. 24A shows an individual timer presetting table stored in the individual timer presetting table storage unit 35.

FIG. 24B shows an individual timer presetting table stored in the individual timer presetting table storage unit 45.

The individual timer presetting table 205 shown in FIG. 24A has the following contents. The "time difference" column shows the time difference, and the time difference in this example indicates that the standard time is obtained by adding 3 minutes 12 seconds 55 to the time managed by the time managing unit 30. The "start time" and "stop time" columns show a start time and a stop time of an event, respectively. The "start event" column shows an event to be executed at the start time, and the "stop event" column shows an event to be executed at the stop time. In this example, the start event "Play,5CH" indicates that a program should be received from the channel "5CH", and the stop event "Stop" indicates that the receiving of the program should be stopped.

The individual timer presetting table 206 shown in FIG. 24B has the following contents. The "time difference" column shows the time difference, and the time difference in this example indicates that the standard time is obtained by subtracting 1 minute 25 seconds 12 from the time managed by the time managing unit 40. The "start time" and "stop time" columns show a start time and astoptime of an event, respectively. The "start event" column shows an event to be executed at the start time, and the "stop event" column shows an event to be executed at the stop time. In this example, the start event "Rec" indicates that a recording should be executed, and the stop event "Stop" indicates that the recording should be stopped.

Each of the individual presetting functioning units 36 and 46 manages the individual timer presetting table and executes the preset operations. More particularly, the individual presetting functioning unit receives the presetting information from the individual presetting unit 213, acquires the current time from the time managing unit in the apparatus itself, compares the acquired current time with the standard current time contained in the presetting information to obtain the time difference, and records the obtained time difference as well as the other information contained in the presetting information into the individual timer presetting table. The individual presetting functioning unit executes a preset event written in the individual timer presetting table by acquiring the current time from the time managing unit in the apparatus itself, acquiring a corrected time using the acquired current time and the time difference, starting an event specified in the table when the acquired time matches the specified start time, and stopping the event when the acquired time matches the specified stop time.

Operation

Figure 25:
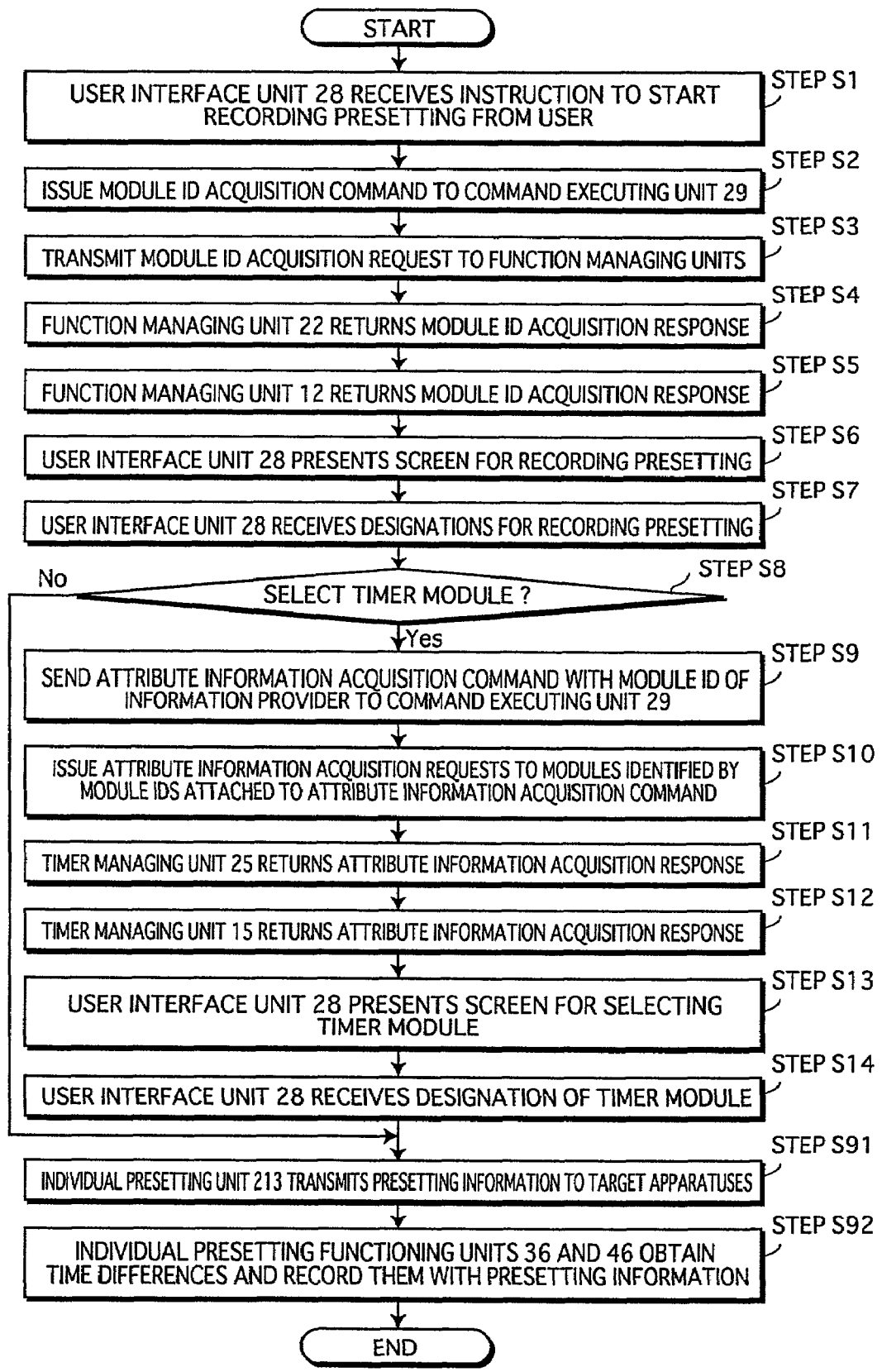
FIG. 25 shows a timer presetting procedure performed by the user using the PC 3002.

FIG. 25 shows a timer presetting procedure performed by the user using the PC 3002.

Now, an operation procedure of a recording presetting as an example of the timer presetting will be described with reference to FIG. 25.

Note that the same steps as those in FIG. 5 in Embodiment 1 are assigned with the same step numbers and will not be detailed here.

Steps S1 to S14

Same as those in FIG. 5 in Embodiment 1.

Step S91

The individual presetting unit 213 acquires a standard current time from a time managing unit and prepares presetting information based on a presetting instruction and necessary information input by the user, and transmits the presetting information to target apparatuses that execute the specified events, where the presetting information contains the standard current time, an event start time, an event stop time, a start event name being a name of an event that should be executed at the start time, a stop event name being a name of an event that should be stopped at the stop time. If the user enters the input data for the recording presetting without selecting a timer module in step S8, the current time is acquired from the time managing unit 20 of the apparatus itself.

Step S92

The individual presetting functioning units 36 and 46 receive the presetting information from the individual presetting unit 213, acquire the current times from the time managing units in the apparatuses themselves, compare the acquired current times with the standard current time contained in the presetting information to obtain the time differences, and record the obtained time differences as well as the other information contained in the presetting information into the individual timer presetting tables.

Figure 26:
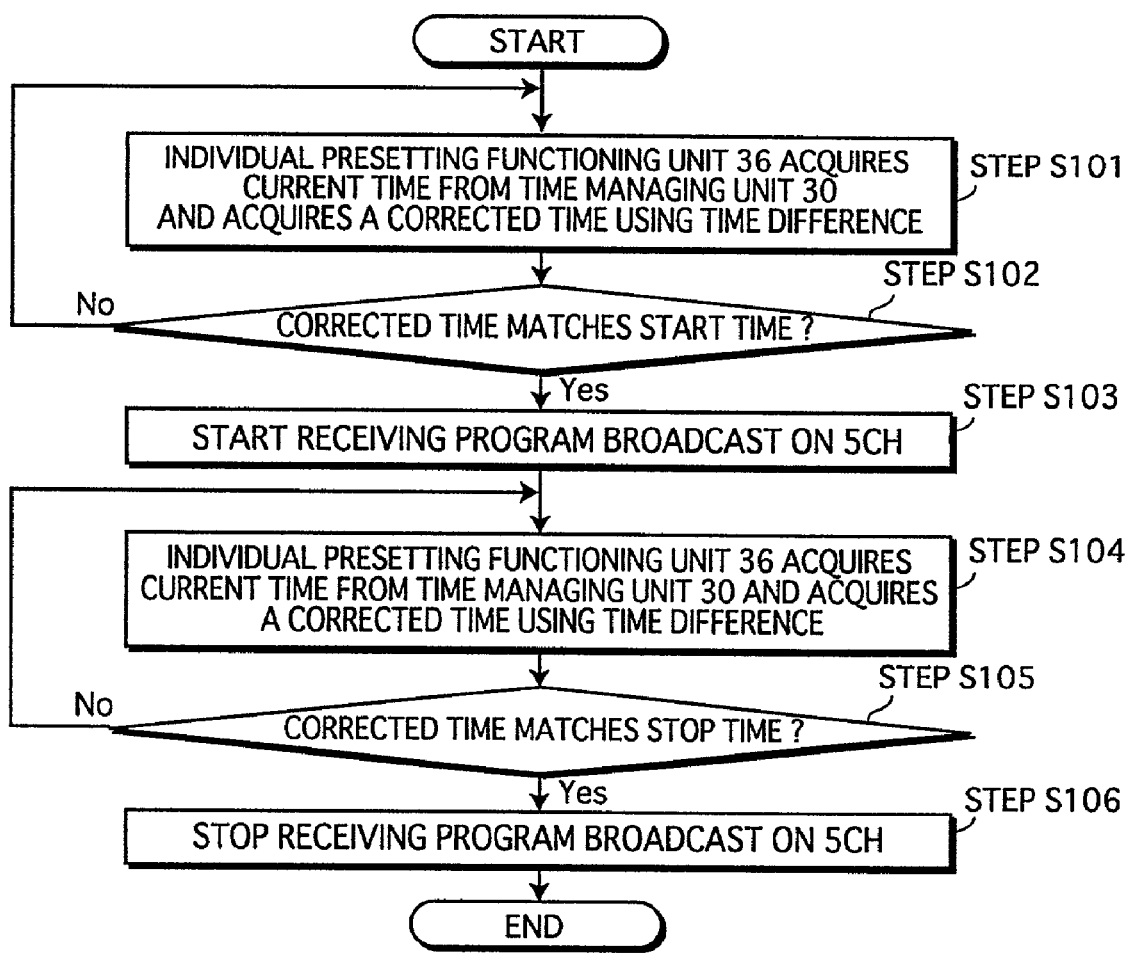
FIG. 26 shows a timer presetting procedure of the tuner 3003.

FIG. 26 shows a timer presetting procedure of the tuner 3003.

Now, an operation procedure of the tuner 3003 will be described with reference to FIG. 26, using a recording presetting as an example of the timer presetting.

It is supposed here that the individual timer presetting table storage unit 35 stores the individual timer presetting table 205 shown in FIG. 24A.

Step S101

The individual presetting functioning unit 36 acquires the current time from the time managing unit 30, and acquires a corrected time using the acquired current time and the time difference written in the individual timer presetting table 205.

Step S102

The individual presetting functioning unit 36 judges whether the corrected time matches the event start time written in the individual timer presetting table 205. If it is judged negatively in step S102, the control returns to the step S101; and if it is judged positively in step S102, the control proceeds to the step S103.

Step S103

The individual presetting functioning unit 36 starts receiving a program broadcast on the channel "5CH" based on the start event name "Play,5CH" written in the individual timer presetting table 205.

Step S104

The individual presetting functioning unit 36 acquires the current time from the time managing unit 30, and acquires a corrected time using the acquired current time and the time difference written in the individual timer presetting table 205.

Step S105

The individual presetting functioning unit 36 judges whether the corrected time matches the event stop time written in the individual timer presetting table 205. If it is judged negatively in step S105, the control returns to the step S104; and if it is judged positively in step S105, the control proceeds to the step S106.

Step S106

The individual presetting functioning unit 36 stops receiving the program based on the stop event name "Stop" written in the individual timer presetting table 205.

Figure 27:
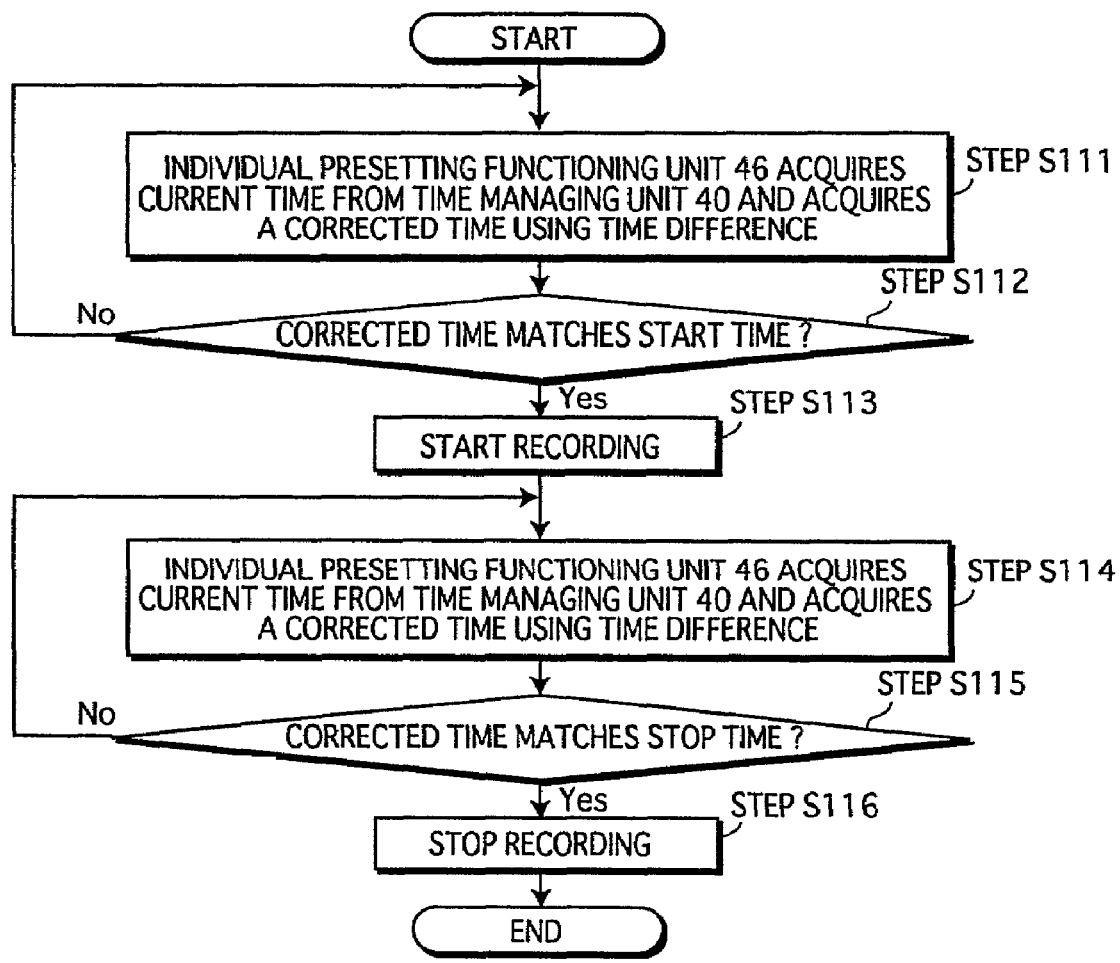
FIG. 27 shows a timer presetting procedure of the VTR 3004.

FIG. 27 shows a timer presetting procedure of the VTR 3004.

Now, an operation procedure of the VTR 3004 will be described with reference to FIG. 27, using a recording presetting as an example of the timer presetting.

It is supposed here that the individual timer presetting table storage unit 45 stores the individual timer presetting table 206 shown in FIG. 24B.

Step S111

The individual presetting functioning unit 46 acquires the current time from the time managing unit 40, and acquires a corrected time using the acquired current time and the time difference written in the individual timer presetting table 206.

Step S112

The individual presetting functioning unit 46 judges whether the corrected time matches the event start time written in the individual timer presetting table 206. If it is judged negatively in step S112, the control returns to the step S111; and if it is judged positively instep S112, the control proceeds to the step S113.

Step S113

The individual presetting functioning unit 46 starts recording based on the start event name "Rec" written in the individual timer presetting table 206.

Step S114

The individual presetting functioning unit 46 acquires the current time from the time managing unit 40, and acquires a corrected time using the acquired current time and the time difference written in the individual timer presetting table 206.

Step S115

The individual presetting functioning unit 46 judges whether the corrected time matches the event stop time written in the individual timer presetting table 206. If it is judged negatively in step S115, the control returns to the step S114; and if it is judged positively in step S115, the control proceeds to the step S116.

Step S116

The individual presetting functioning unit 46 stops recording based on the stop event name "Stop" written in the individual timer presetting table 206.

As described above, apparatuses on the network can synchronize with each other in terms of the operation even if the times managed by the time managing units on the network do not synchronize.

Variation

Summary

The controllers in Embodiments 1 to 3 allow the user to select a module that manages the standard time, for each event. In contrast, the controller in Variation stores, for each event, information of a module selected by the user, and asks the user the next time and onward whether the user will select a new module or use a module whose information has been stored in the controller.

Construction

Figure 28:
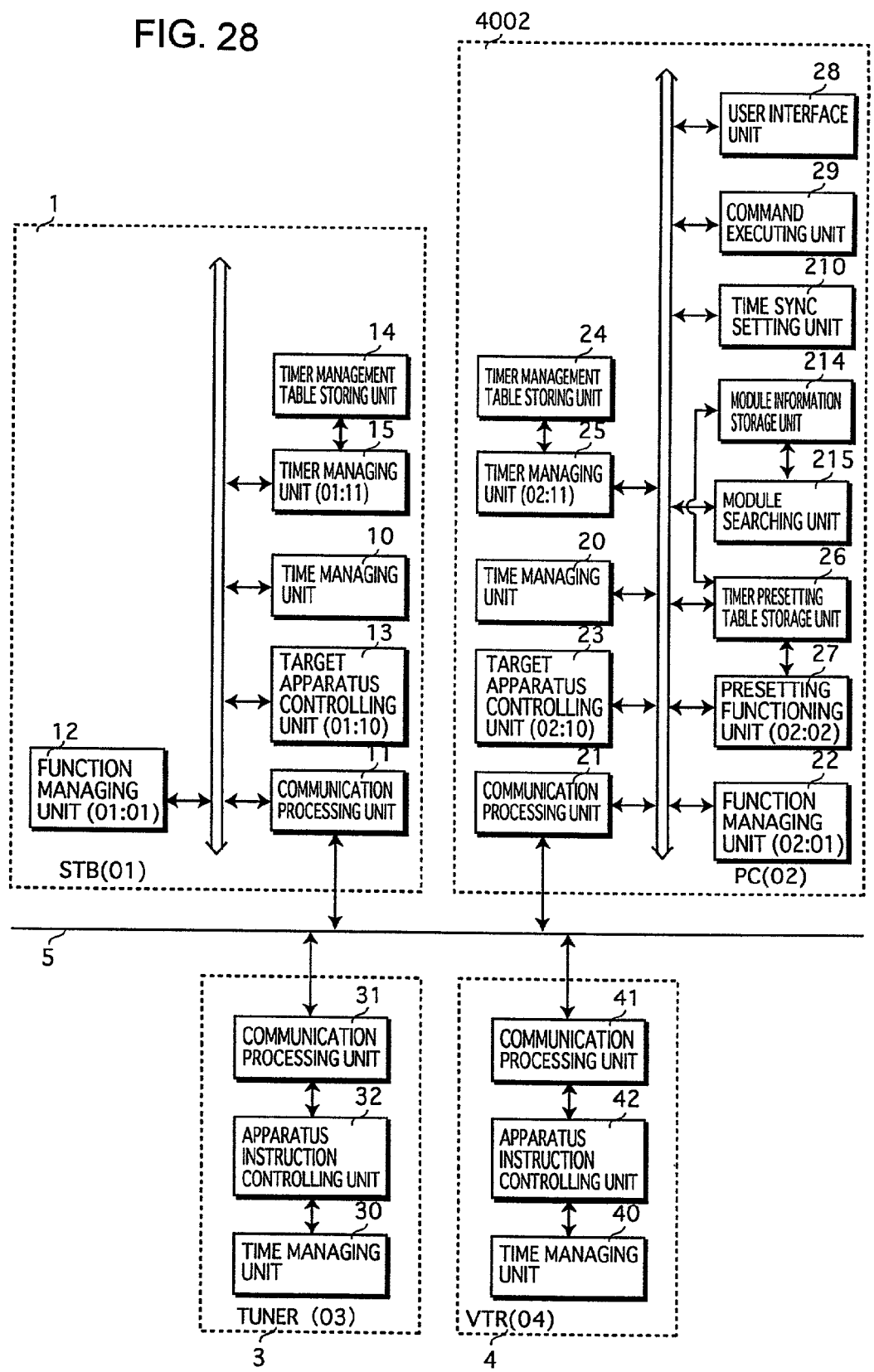
FIG. 28 shows the construction of a network to which a plurality of apparatuses relating to Variation of the present invention are connected.

FIG. 28 shows the construction of a network to which a plurality of apparatuses relating to Variation of the present invention are connected.

In FIG. 28, the STB 1 and the PC 4002 are controllers, the tuner 3 and the VTR 4 are target apparatuses. These apparatuses constitute the network 5 and can communicate with each other via the network 5.

Note that the same elements as those in Embodiment 1 have the same reference numbers, without further explanation here.

The PC 4002 is a personal computer that controls the VTR 4, and includes a time managing unit 20, a communication processing unit 21, a function managing unit 22, a target apparatus controlling unit 23, a timer management table storing unit 24, a timer managing unit 25, a timer presetting table storage unit 26, a presetting functioning unit 27, a user interface unit 28, a command executing unit 29, a time sync setting unit 210, a module information storage unit 214, and a module searching unit 215.

The module information storage unit 214 stores, for each event, a time ID of a timer module that provides a standard time, where the timer module is selected by the user in relation to the event that is preset by the user. For example, the module information storage unit 214 stores each timer ID together with (a) an event command and (b) a module ID specified for the timer presetting.

The module searching unit 215, when the user is to preset an event, judges whether the user once preset a similar event in the past and selected a timer module that provides a standard time by checking whether the module information storage unit 214 stores a timer ID for this kind of event. After judging that the module information storage unit 214 stores a timer ID, the module searching unit 215 allows the user either to select a new timer module or to use the timer module having the timer stored in the storage unit 214. It should be noted here that the command and the timer-preset module of the "similar event" should be the same as the event in the issue, but the preset time or the like may be different.

FIG. 29A shows a recording presetting screen for receiving a recording presetting from the user. FIG. 29B shows the recording presetting screen that is currently asking the user whether the user is to use a timer module that was once selected by the user and information of which has been stored.

Operation

Figure 30:
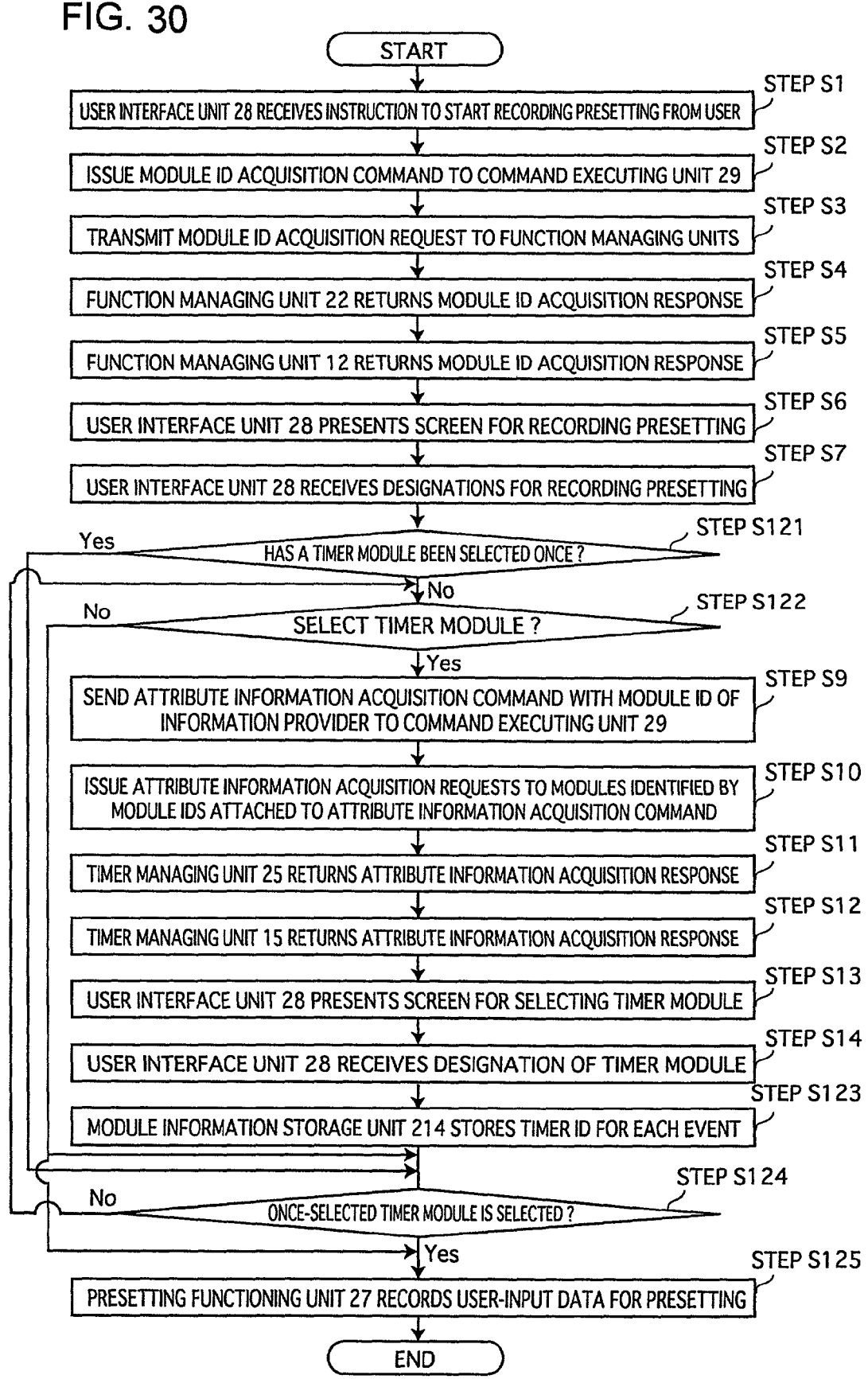
FIG. 30 shows a timer presetting procedure performed by the user using the PC 4002.
Figure 31:
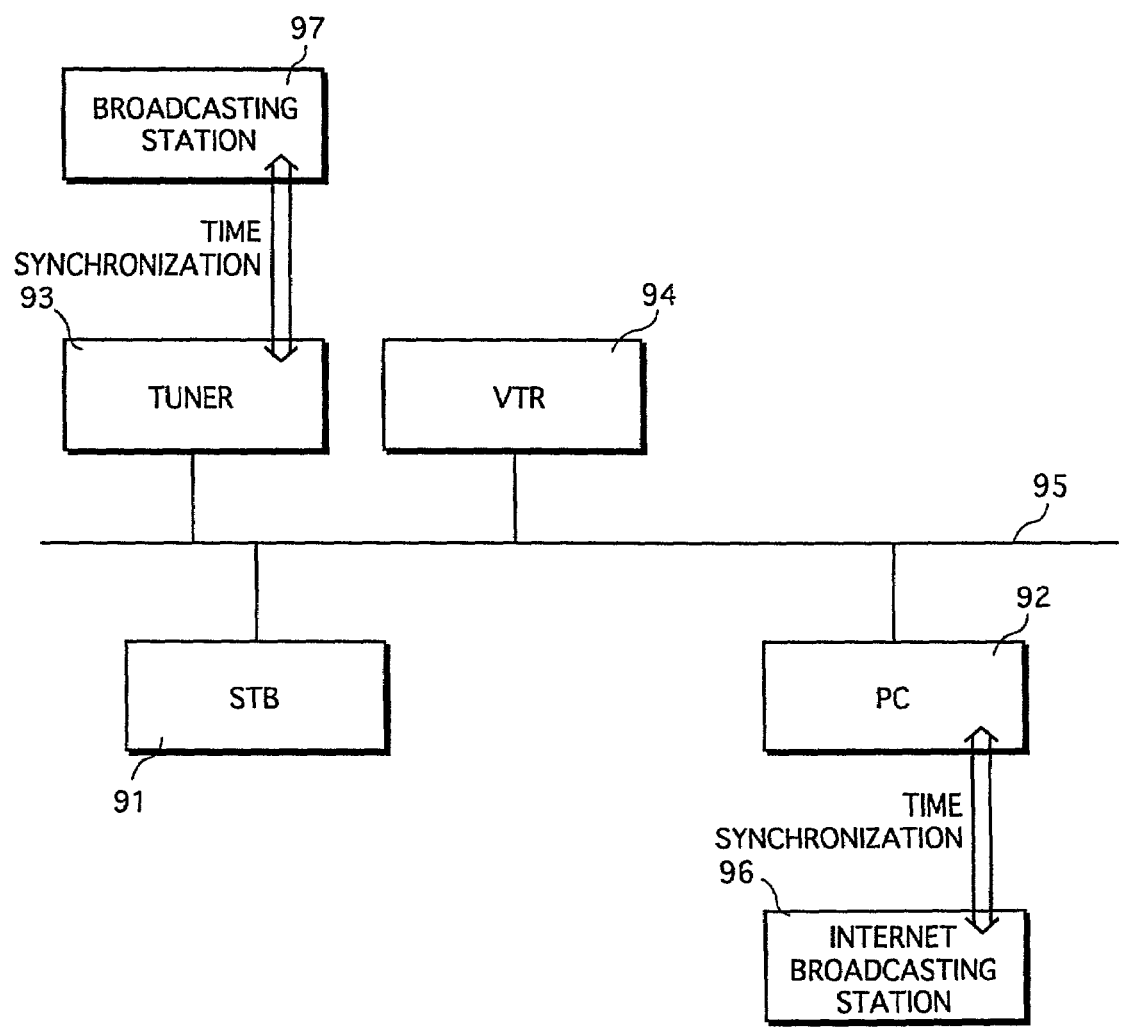
FIG. 31 shows a conventional network structure, where a plurality of apparatuses are connected to the network.

FIG. 30 shows a timer presetting procedure performed by the user using the PC 4002.

Now, an operation procedure of a recording presetting as an example of the timer presetting will be described with reference to FIG. 30.

Note that the same steps as those in FIG. 5 in Embodiment 1 are assigned with the same step numbers and will not be detailed here.

Steps S1 to S7

Same as those in FIG. 5 in Embodiment 1.

Step S121

The module searching unit 215 judges whether the user once preset a similar event in the past and selected a timer module that provides a standard time by checking whether the module information storage unit 214 stores a timer ID for this kind of event. If it is judged negatively in the step S121, the control proceeds to step S122. If it is judged positively in the step S121, the control moves to step S124.

Step S122

The user interface unit 28 urges the user to decide whether to select a new timer module or to enter the input contents. If the user decides to enter the input contents in the step S122, the control jumps to the step S124.

Steps S9 to S14

Same as those in FIG. 5 in Embodiment 1.

Step S123

The module information storage unit 214 stores a timer ID of the selected timer module for each event.

Step S124

The module searching unit 215 allows the user interface unit 28 to display the name of the stored timer module and ask the user whether the user selects the once-selected timer module. If it is judged negatively in the step S124, the control proceeds to step S122. If it is judged positively in the step S124, the control moves to step S125.

Step S125

The presetting functioning unit 27 records into the timer presetting table the data input by the user for the recording presetting. If the user enters the input data for the recording presetting without selecting a timer module in step S122, the time managing unit 20 is automatically selected. In this example, the presetting functioning unit 27 records the timer ID of the time managing unit 30, start time, stop time, start command, and stop command into the timer presetting table. The presetting functioning unit 27 also records into the timer presetting table module ID "01:10" of the target apparatus controlling unit 13 that can read the current time from the time managing unit 30 selected by the user. FIG. 4 shows the timer presetting table generated in this procedure.

With the above construction and procedure, it is possible to automatically select a timer module that provides a standard time, for such events as are similar to each other.

Note that while the above Variation is a variation of Embodiment 1, Embodiments 2 and 3 may be varied in a similar way.

It is possible to record onto a computer-readable record medium a program that allows a computer to execute the operations described in Embodiment 1, 2, or 3, and to sell or distribute the record medium.

The computer-readable record medium is, for example, a record medium that can be attached and detached, such as a floppy disk, a CD, an MO, a DVD, or a memory card, or a fixed-type record medium such as a hard disk or a semiconductor memory.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A time managing apparatus that manages times clocked by a plurality of timer modules in target apparatuses connected to each other on a network, the time managing apparatus comprising:

a presetting information receiving means for receiving from outside presetting information which is based on an input from a user and contains (a) event start time information that indicates an event start time at which one or more events should be started by each of the target apparatuses, (b) event type information indicating an event type for each of the one or more events, (c) two or more apparatus identifiers for two or more target apparatuses among the target apparatuses on the network that should execute the one or more events, and (d) a piece of management information that identifies a timer module selected from the plurality of timer modules in target apparatuses connected to each other on a network, wherein it is judged, based on the timer module, whether or not the event start time has been reached;

a presetting information transmitting means for transmitting the event start time information and the event type information received by the presetting information receiving means, to the two or more target apparatuses identified by the received two or more apparatus identifiers;

a vicarious time managing means for acquiring a standard time from the timer module identified by the received management information and managing times vicariously in correspondence with pieces of management information;

a standard time acquisition request receiving means for receiving standard time acquisition requests, which are based on the transmitted event start time information and the event type information, from the two or more target apparatuses to which the event start time information and the event type information were transmitted by the presetting information transmitting means; and a standard time transmitting means for transmitting, to each of the two or more target apparatuses, a standard time managed by the vicarious time managing means to cause the target apparatus to judge whether the transmitted standard time matches the event start time information transmitted by the presetting information transmitting means, and if the target apparatus judges that the standard time matches the event start time information, cause the target apparatus to execute an event indicated by the event type information transmitted by the presetting information transmitting means.

2. The time managing apparatus of claim 1, wherein the presetting information transmitting means further transmits the management information received by the presetting information receiving means, together with the event start time information and the event type information to the two or more target apparatuses, the standard time acquisition request receiving means receives the standard time acquisition requests that are attached with the management information, from the two or more target apparatuses, and the standard time transmitting means transmits standard times identified by the management information attached to the standard time acquisition requests, among standard times managed by the vicarious time managing means, to the two or more target apparatuses.

3. The time managing apparatus of claim 2 further comprising:

a management information storage means for storing the piece of management information received by the presetting information receiving means, by correlating the piece of management information with at least one of a piece of event type information and at least one of the apparatus identifier, wherein if the presetting information receiving means receives at least one of a piece of event type information and an apparatus identifier, without receiving management information, the presetting information receiving means searches the management information storage means for a piece of management information that correlates with the received piece of event type information and/or apparatus identifier, and if the presetting information receiving means finds such a piece of management information, the presetting information receiving means allows the found piece of management information to be selected automatically.

4. A target apparatus for receiving a time from a time managing apparatus and executing an event based on the received time, the time managing apparatus managing times clocked by a plurality of timer modules in target apparatuses connected to each other on a network, the target apparatus comprising:

a presetting information receiving means for receiving (a) event start time information that indicates an event start time at which one or more events should be started, (b) management information, and (c) event type information indicating an event type for each of the one or more events, from a time managing apparatus that manages a standard time vicariously for a time module selected from the plurality of timer modules in target apparatuses connected to each other on a network, that clocks the standard time, by attaching the management information to the standard time, wherein it is judged, based on the timer module, whether or not the event start time has been reached;

a holding means for holding the received event start time information, management information, and event type information;

a time acquisition request transmitting means for transmitting to the time managing apparatus, a time acquisition request with the received management information attached thereto;

a time receiving means for receiving from the time managing apparatus, a standard time identified by the transmitted management information among the standard times managed by the time managing apparatus;

a judging means for judging whether the event start time is reached by comparing the received standard time with the event start time indicated by the event start time information held by the holding means; and an executing means for starting to execute an event that is indicated by the event type information held by the holding means when the judging means judges that the event start time is reached by transmitting triggers to two or more target apparatus so that the two or more target apparatus start executing the one or more events simultaneously.

5. A time managing method for a time managing apparatus that manages times clocked by a plurality of timer modules in target apparatuses connected to each other on a network, the time managing apparatus comprising a recording medium, the time managing method comprising:

a presetting information receiving step for receiving from outside presetting information which is based on an input from a user and contains (a) event start time information that indicates an event start time at which one or more events should be started by each of the target apparatuses, (b) event type information indicating an event type for each of the one or more events, (c) two or more apparatus identifiers for two or more target apparatuses among the target apparatuses on the network that should execute the one or more events, and (d) a piece of management information that identifies a timer module selected from the plurality of timer modules in target apparatuses connected to each other on a network, wherein it is judged, based on the timer module, whether or not the event start time has been reached;

a presetting information transmitting step for transmitting the event start time information and the event type information received in the presetting information receiving step, to the two or more target apparatuses identified by the received two or more apparatus identifiers;

a standard time acquisition request receiving step for receiving standard time acquisition requests, which are based on the transmitted event start time information and the event type information, from the two or more target apparatuses to which the event start time information and the event type information were transmitted in the presetting information transmitting step; and a standard time transmitting step for transmitting, to each of the two or more target apparatuses, a standard time managed by the vicarious time managing means to cause the target apparatus to judge whether the transmitted standard time matches the event start time information transmitted in the presetting information transmitting step, and if the target apparatus judges that the standard time matches the event start time information, cause the target apparatus to execute an event indicated by the event type information transmitted in the presetting information transmitting step.

6. A time managing method for a target apparatus for receiving a time from a time managing apparatus and executing an event based on the received time, the time managing apparatus managing times clocked by a plurality of timer modules in target apparatuses connected to each other on a network, the target apparatus comprising a recording medium, the time managing method comprising:

a presetting information receiving step for receiving (a) event start time information that indicates an event start time at which one or more events should be started, (b) management information, and (c) event type information indicating an event type for each of the one or more events, from a time managing apparatus that manages a standard time vicariously for a timer module selected from the plurality of timer modules in target apparatuses connected to each other on a network, that clocks the standard time, by attaching the management information to the standard time, wherein it is judged, based on the timer module, whether or not the event start time has been reached;

a holding step for holding the received event start time information, management information, and event type information;

a time acquisition request transmitting step for transmitting to the time managing apparatus, a time acquisition request with the received management information attached thereto;

a time receiving step for receiving from the time managing apparatus, a standard time identified by the transmitted management information among the standard times managed by the time managing apparatus;

a judging step for judging whether the event start time is reached by comparing the received standard time with the event start time indicated by the event start time information recorded in the recording medium; and an executing step for starting to execute an event that is indicated by the event type information recorded in the recording medium when the judging step judges that the event start time is reached by transmitting triggers to two or more target apparatus so that the two or more target apparatus start executing the one or more events simultaneously.

7. An apparatus comprising a machine readable medium containing instructions which, when executed by a machine, cause the machine to perform operations comprising:

receiving from outside presetting information which is based on an input from a user and contains (a) event start time information that indicates an event start time at which one or more events should be started by each of the apparatuses on the network, (b) event type information indicating an event type for each of the one or more events, (c) two or more apparatus identifiers for two or more target apparatuses among the target apparatuses on the network that should execute the one or more events, and (d) a piece of management information that identifies a timer module selected from the plurality of timer modules in target apparatuses connected to each other on a network, wherein it is judged, based on the timer module, whether or not the event start time has been reached;

transmitting the event start time information and the event type information received in the presetting information receiving, to the two or more target apparatuses identified by the received two or more apparatus identifiers;

acquiring a standard time from the timer module identified by the received management information and managing times vicariously for each of the plurality of timer modules in correspondence with pieces of management information;

receiving standard time acquisition requests, which are based on the transmitted event start time information and the event type information, from the two or more target apparatuses to which the event start time information and the event type information were transmitted in the presetting information transmitting; and transmitting, to each of the two or more target apparatuses, a standard time managed by the vicarious time managing means to cause the target apparatus to judge whether the transmitted standard time matches the event start time information transmitted in the presetting information transmitting, and if the target apparatus judges that the standard time matches the event start time information, cause the target apparatus to execute an event indicated by the event type information transmitted in the presetting information transmitting.

8. An apparatus comprising a machine readable medium containing instructions which, when executed by a machine, cause the machine to perform operations comprising:

receiving (a) event start time information that indicates an event start time at which one or more events should be started, (b) management information, and (c) event type information indicating an event type for each of the one or more events, from a time managing apparatus that manages a standard time vicariously for a timer module selected from the plurality of timer modules in target apparatuses connected to each other on a network, that clocks the standard time, by attaching the management information to the standard time, wherein it is judged, based on the timer module, whether or not the event start time has been reached;

holding the received event start time information, management information, and event type information;

transmitting to the time managing apparatus, a time acquisition request with the received management information attached thereto;

receiving from the time managing apparatus, a standard time identified by the transmitted management information among the standard times managed by the time managing apparatus;

judging whether the event start time is reached by comparing the received standard time with the event start time indicated by the event start time information recorded in the recording medium; and an executing for starting to execute an event that is indicated by the event type information recorded in the recording medium when the judging judges that the event start time is reached by transmitting triggers to two or more target apparatus so that the two or more target apparatus start executing the one or more events simultaneously.

9. The time managing apparatus of claim 1 wherein:

the presetting information receiving means receives a first piece of management information identifies a first timer module and a second piece of management information that identifies a second timer module;

the vicarious time managing means acquires a first standard time from the first timer module identified by the first received management information and a second standard time from the second time module identified by the second received management information;

the time standard time acquisition request receiving means receives a first standard time acquisition request from a first target apparatus, and a second standard time acquisition request from a second target apparatus; and the standard time transmitting means transmits to the first target apparatus the first standard time, and to the second target apparatus the second standard time.

10. The time managing apparatus of claim 1 further comprising:

a management information storage unit for storing the piece of management information received by the presetting information receiving means, by correlating the piece of management information with at least one of a piece of event type information and at least one of the apparatus identifiers.

11. The time managing apparatus of claim 10 further comprising:

a vicarious time management storage unit for storing the piece of management information correlated with a source information indicating a location to obtain a standard time.

12. A time managing and execution system comprising a time managing apparatus and a plurality of target apparatuses, wherein the time managing apparatus that manages times clocked by a plurality of timer modules in the target apparatuses connected to each other on a network, and the target apparatuses receive a time from the time managing apparatus and execute an event based on the received time, the time managing apparatus comprising:

a presetting information receiving means for receiving from outside presetting information which is based on an input from a user and contains (a) event start time information that indicates an event start time at which one or more events should be started by each of the target apparatuses, (b) event type information indicating an event type for each of the one or more events, (c) two or more apparatus identifiers for two or more target apparatuses among the target apparatuses on the network that should execute the one or more events, and (d) a piece of management information that identifies a timer module selected from the plurality of timer modules in target apparatuses connected to each other on a network, wherein it is judged, based on the timer module, whether or not the event start time has been reached;

a presetting information transmitting means for transmitting the event start time information, the event type information and the management information received by the presetting information receiving means, to the two or more target apparatuses identified by the received two or more apparatus identifiers;

a vicarious time managing means for acquiring a standard time from the timer module identified by the received management information and managing times vicariously for each of the plurality of timer modules in correspondence with pieces of management information;

a standard time acquisition request receiving means for receiving standard time acquisition requests attached with the management information, the requests being based on the transmitted event start time information and the event type information, from the two or more target apparatuses to which the event start time information and the event type information were transmitted by the presetting information transmitting means; and a standard time transmitting means for transmitting standard times identified by the management information attached to the standard time acquisition requests, among standard times managed by the vicarious time managing means, to the two or more target apparatuses, each of the target apparatuses comprising:

a presetting information receiving means for receiving (a) event start time information that indicates an event start time at which one or more events should be started, (b) management information, and (c) event type information indicating an event type for each of the one or more events, from a time managing apparatus that manages a standard time vicariously for a timer module selected from the plurality of timer modules in target apparatuses connected to each other on a network, that clocks the standard time, by attaching the management information to the standard time, wherein it is judged, based on the timer module, whether or not the event start time has been reached;

a holding means for holding the received event start time information, management information and event type information;

a time acquisition request transmitting means for transmitting to the time managing apparatus, a time acquisition request with the received management information attached thereto;

a time receiving means for receiving from the time managing apparatus, a standard time identified by the transmitted management information among the standard times managed by the time managing apparatus;

a judging means for judging whether the event start time is reached by comparing the received standard time with the event start time indicated by the event start time information held by the holding means; and an executing means for starting to execute an event that is indicated by the event type information held by the holding means when the judging means judges that the event start time is reached by transmitting triggers to two or more target apparatus so that the two or more target apparatus start executing the one or more events simultaneously.

* * * * *

UNITED STATES PATENT AND TRADEMARK OFFICE
CERTIFICATE OF CORRECTION

PATENT NO. : 7,281,061 B2  Page 1 of 1
APPLICATION NO. : 10/007807
DATED : October 9, 2007
INVENTOR(S) : Takeda It is certified that error appears in the above-identified patent and that said Letters Patent is hereby corrected as shown below:

In the Claims:
In Claim 4, Column 41, line 36, ".receiving" should be --receiving--
In Claim 4, Column 41, line 42, "time module" should be --timer module--
In Claim 9, Column 44, line 48, "time module" should be --timer module--

Signed and Sealed this

Eleventh Day of March, 2008

JON W. DUDAS
*Director of the United States Patent and Trademark Office*